United States Patent
Matufuji et al.

(10) Patent No.: US 6,854,541 B2
(45) Date of Patent: Feb. 15, 2005

(54) POWER TAKE-OFF ASSEMBLY OF A WORKING VEHICLE

(76) Inventors: Mizuya Matufuji, 2-18-1 Inadera Amagasaki-shi, Hyogo (JP); Gen Yoshii, 2-18-1 Inadera Amagasaki-shi, Hyogo (JP)

(*) Notice: Subject to any disclaimer, the term of this patent is extended or adjusted under 35 U.S.C. 154(b) by 162 days.

(21) Appl. No.: 10/289,458

(22) Filed: Nov. 7, 2002

(65) Prior Publication Data

US 2003/0085061 A1 May 8, 2003

(30) Foreign Application Priority Data

Nov. 7, 2001 (JP) ..................................... 2001-341497

(51) Int. Cl.$^7$ ............................................. B60K 25/00
(52) U.S. Cl. ................... 180/53.1; 74/15.4; 74/606 R
(58) Field of Search ...................... 180/53.1, 53.6, 180/53.61, 53.62; 172/74, 492, 521; 74/11, 15.4, 15.6, 606 R

(56) References Cited

U.S. PATENT DOCUMENTS

| | | | | |
|---|---|---|---|---|
| 2,601,818 A | * | 7/1952 | Zwemke | 172/74 |
| 3,352,165 A | | 11/1967 | Lee | |
| 3,464,277 A | | 9/1969 | Longshore | |
| 3,513,712 A | | 5/1970 | Zajichek et al. | |
| 3,715,704 A | * | 2/1973 | Boyle et al. | 74/15.4 |
| 3,991,629 A | * | 11/1976 | Dearnley | 74/15.4 |
| 4,287,778 A | * | 9/1981 | Quick | 74/15.4 |
| 4,579,183 A | * | 4/1986 | Irikura et al. | 180/53.1 |
| 5,667,330 A | | 9/1997 | Henkel et al. | |
| 5,937,697 A | * | 8/1999 | Matsufuji | 74/11 |
| 5,997,425 A | * | 12/1999 | Coutant et al. | 475/18 |
| 6,401,848 B1 | * | 6/2002 | Vu | 180/53.1 |

FOREIGN PATENT DOCUMENTS

| | | | | |
|---|---|---|---|---|
| DE | 2933168 A | * | 4/1980 | A01B/71/06 |
| JP | 05050866 A | * | 3/1993 | B60K/17/28 |

* cited by examiner

*Primary Examiner*—Paul N. Dickson
*Assistant Examiner*—Laura B. Rosenberg
(74) *Attorney, Agent, or Firm*—Sterne, Kessler, Goldstein & Fox PLLC

(57) ABSTRACT

A reversible PTO shaft having opposite splined ends whose numbers of teeth are different from each other is inserted at one of the splined ends into an output sleeve and not-relatively rotatably connected to the output sleeve. For constituting at a position out of the PTO transmission system an actuator for changing the rotary speed of the output sleeve and holding the output sleeve changed in rotary speed simultaneously to the reversing of PTO shaft, a second collar connected to a shifter collar for changing the rotary speed of output sleeve so as to be slidable integrally with the shifter collar is disposed on an inner end of the output sleeve. When the splined end of PTO shaft having the greater number of teeth is inserted into the output sleeve, a sensor having a cam surface is moved by an end surface of the PTO shaft so as to make a pin project from the output sleeve, thereby holding the second collar at its low speed position. A power take-off assembly which sets the output sleeve into either a low speed mode or a high speed mode simultaneously to the reversing of the PTO shaft is also disclosed.

7 Claims, 17 Drawing Sheets

POWER TAKE-OFF ASSEMBLY OF A WORKING VEHICLE

BACKGROUND OF THE INVENTION

1. Field of the Invention

The present invention relates to a power take-off assembly provided at a longitudinal end portion of a working vehicle for driving a working implement attached to the end portion of the vehicle. More particularly, it relates to a power take-off assembly comprising an output sleeve, which is variable in rotary speed thereof and disposed at the end portion of the vehicle longitudinally of the vehicle, and a reversible PTO shaft, whose opposite splined ends are different in their number of teeth, wherein, in correspondence to a kind of the attached working implement, one splined end of the reversible PTO shaft is selectively inserted into the output sleeve and not-relatively rotatably connected to the output sleeve so that the other splined end of the PTO shaft projects outward from the vehicle to be drivingly connected to the working implement.

2. Background Art

As disclosed in U.S. Pat. Nos. 3,513,712, 3,352,165, 3,464,277 and 5,667,330, there are well-known conventional working vehicles, e.g., conventional tractors, each of which is provided with a single PTO shaft that is splined on opposite end peripheries thereof. One end of the PTO shaft is splined coarsely (e.g., so as to form six teeth), and the other end finely (e.g., so as to form twenty one teeth). One splined end of the PTO shaft is selectively inserted into an output sleeve disposed in either front or rear end portion of the vehicle so that the other end of the PTO shaft projects forwardly or rearwardly outward from the end portion of the vehicle so as to be connected to an input shaft of a working implement attached to the end portion of the vehicle through universal joints etc. For driving a working implement requiring a low driving speed (e.g., 840 rpm), the finely splined end of the PTO shaft is inserted into the output sleeve so as to make the coarsely splined end thereof project outward. If a working implement requiring a high driving speed (e.g., 1000 rpm) is going to be driven, the PTO shaft is disposed so as to make the finely splined end thereof project outward.

The output sleeve disclosed in U.S. Pat. No. 3,513,712 is variable in its rotary speed, however, the rotary speed thereof is not changed to correspond to which of the splined ends of the PTO shaft is inserted thereinto.

Each of the output sleeves disclosed in U.S. Pat. Nos. 3,352,165, 3,464,277 and 5,667,330 is allowed to be selectively connected to one of two gear trains which are different from each other in their gear ratios. Two gears of the respective gear trains are freely rotatably disposed around the output sleeve, and an actuator for engaging one of the gears with the PTO shaft through the output sleeve is disposed between the gears. The actuator automatically engages the PTO shaft with one of the gears according to which splined end of the PTO shaft is inserted into the output sleeve.

However, such an actuator interposed in the PTO driving system tends to increase the size of the PTO speed changing arrangement which changes the rotary speed of the output sleeve. Furthermore, the actuator is not suited to a working vehicle having a lever-operated speed changing mechanism for the output sleeve.

BRIEF SUMMARY OF THE INVENTION

An object of the present invention is to provide a novel power take-off system of a working vehicle, wherein a mechanism, which changes the rotary speed of an output sleeve and holds the output sleeve changed in rotary speed at the time when a PTO shaft is reversed and inserted into the output sleeve, is disposed out of a power transmission system to the PTO shaft.

To achieve the object, a power take-off assembly of the present invention is constructed as follows: an output sleeve is disposed longitudinally of the vehicle in an end portion of the vehicle. A low speed gear and a high speed gear, which is greater in rotary speed than the low speed gear, are freely rotatably provided around the output sleeve. A shifter collar is disposed around the output sleeve between the high and low speed gears so as to selectively engage one of the high and low speed gears with the output sleeve. A PTO shaft having two opposite splined ends that are different from each other in number of teeth is selectively reversibly inserted at one of the splined ends thereof into the output sleeve, not-relatively rotatably connected to the output sleeve, and extended at the other splined end thereof outward from the end portion of the vehicle. A second collar is disposed around an inner end portion of the output sleeve and connected to the shifter collar so as to slide integrally with the shifter collar on the output sleeve. An actuator for restraining the sliding of the second collar on the output sleeve is actuated by an end surface of the PTO shaft so as to hold the second collar at a position where the low speed gear engages with the output sleeve when one splined end that is greater in number of teeth than the other splined end is inserted into the output sleeve.

The actuator connects the low speed gear to the output sleeve when the splined end having the greater number of teeth is inserted into the output sleeve so as to make the splined end having the fewer teeth project outward from the vehicle, thereby rotating the PTO shaft at the predetermined low speed. In this state, since the actuator holds the second collar, the shifter collar is held in place so as to prevent an attached working implement from being unexpectedly driven at high speed while the splined end having the fewer teeth projects outward, thereby ensuring safety. If the PTO shaft is disposed so as to make the splined end having the greater number of teeth project outward from the vehicle, the shifter collar is allowed to slide so as to connect the high speed gear to the output sleeve so that the output sleeve may be rotated at the predetermined high speed. Even if the output sleeve remains rotating at the low speed, it is not a safety problem.

Since the actuator, which is actuated by an end surface of the PTO shaft when the splined end having the more teeth is inserted into the output sleeve, attempts to hold the second collar disposed on the inner end of the output sleeve so as to hold the shifter collar at its low speed position, the actuator comes to be disposed correspondingly to the inner end of the output sleeve apart from the transmission system to the PTO shaft. Accordingly, the actuator does not increase the size of the arrangement for speed changing of the output sleeve. The shifter collar may be also used if it is operated for speed changing of the output sleeve by a lever without the actuator, so that the power take-off assembly specification can be changed easily.

As another aspect, a power take-off assembly according to the present invention is so constructed as follows: an output sleeve is disposed longitudinally of the vehicle in an end portion of the vehicle. A low speed gear and a high speed gear, which is greater in rotary speed than the low speed gear, are freely rotatably provided around the output sleeve. A shifter collar is disposed around the output sleeve between the high and low speed gears so as to selectively engage one of the high and low speed gears with the output sleeve. A PTO shaft having two opposite splined ends that are different from each other in number of teeth is selectively reversibly inserted at one of the splined ends thereof into the output sleeve, not-relatively rotatably connected to the output sleeve, and extended at the other splined end thereof outward from the end portion of the vehicle. A second collar is disposed around an inner end portion of the output sleeve and connected to the shifter collar so as to slide integrally with the shifter collar on the output sleeve. An actuator for restraining the sliding of the second collar prevents the splined end that is greater in number of teeth than the other splined end from being inserted into the output sleeve over a predetermined depth when the high speed gear engages with said output sleeve.

Due to this construction, when the output sleeve engages with the high speed gear so as to be rotated at high speed, the PTO shaft is prevented from being set into such a low speed rotation mode that the splined end thereof having the greater number of teeth is inserted into the output sleeve and the splined end thereof having the fewer teeth projects outward. That is, safety is ensured by preventing the splined end having fewer teeth from projecting outward from the vehicle unless the shifter collar and the second collar are returned to their low speed position where the low speed gear engages with the output sleeve. Such a power take-off assembly has the same advantage mentioned above.

Preferably, the actuator is so constructed for its sure actuation as follows: a sensor is slidably disposed in the inner end portion of the output sleeve. The sensor has a cam surface which is slanted in an axial direction of the output sleeve. The output sleeve is bored by a hole into which a pin disposed radially about the output sleeve is engaged so as to abut against the cam surface of the sensor. The pin abutting against the cam surface is allowed to project from the output sleeve through the hole so as to fit into a recess formed on an inner peripheral surface of the second collar.

As a preferable aspect for connecting the second collar to the shifter collar so as to make the shifter collar slidable integrally with the second collar, a shift fork for sliding the shifter collar is fixed onto a slidably supported fork shaft, and a second fork fitting onto the second collar is not-relatively slidably but relatively rotatably supported by the fork shaft. Such a fork shaft, as well as the shifter collar, may be also used in a power take-off assembly of which the output sleeve is changed in rotary speed by a lever without the actuator. During assembly, the second fork which is rotatable relatively to the fork shaft is allowed to be rotated considerably so as to suit the second collar properly even if there is a phase difference between the second fork and the second collar.

As an alternative aspect, a power take-off assembly according to the present invention is so constructed as follows: an output sleeve is disposed longitudinally of the vehicle in an end portion of the vehicle. A low speed gear and a high speed gear which is greater in rotary speed than the low speed gear are freely rotatably provided around the output sleeve. A PTO shaft having two opposite splined ends, whose numbers of teeth are different from each other, is selectively reversibly inserted at one of the splined ends thereof into the output sleeve, not-relatively rotatably connected to the output sleeve, and extended at the other splined end thereof outward from the end portion of the vehicle. A collar is not-relatively rotatably but slidably disposed around an inner end portion of the output sleeve so as to selectively engage one of the high and low speed gears with the output sleeve. An actuator for sliding the collar on the output sleeve slides the collar to one position where the low speed gear engages with the output sleeve when one splined end having the greater number of teeth is inserted into the output sleeve, and to another position where the high speed gear engages with the output sleeve when the other splined end having less teeth is inserted into the output sleeve. A first pin is disposed in the output sleeve so as to constitute the actuator. The position of the first pin in an axial direction of the output sleeve is changed correspondingly to the insertion state of the PTO shaft into the output sleeve.

In this way, when the PTO shaft is so disposed that the splined end having the greater number of teeth is inserted into the output sleeve and the other splined end having fewer teeth projects outward from the vehicle, the PTO shaft integrated with the output sleeve is rotated at low speed, and when the PTO shaft is so disposed that the splined end having fewer teeth is inserted into the output sleeve and the splined end having the greater number of teeth projects outward from the vehicle, the PTO shaft integrated with the output sleeve is rotated at high speed. Consequently, the rotary speed of PTO shaft is automatically set to correspond to the insertion state of the PTO shaft into the output sleeve.

Since the collar is disposed on the inner end of the output sleeve and slid to engage selectively one of the high and low speed gears with the output sleeve by the actuator including the pin whose position in the axial direction of the output sleeve is changed correspondingly to the insertion state of the PTO shaft into the output sleeve, the actuator comes to be located at a position corresponding to the inner end of the output sleeve so as not to increase the size of the speed changing arrangement for the output sleeve. The collar may be also operated by a lever without the actuator so as to be also usable for a power take-off assembly whose output sleeve is changed in rotary speed by operating a lever without the actuator, thereby facilitating changes in the specifications of the power take-off assembly.

As a preferable aspect of the actuator for ensuring its actuation, a slot is formed in the output sleeve so as to have some length in the axial direction of the output sleeve. A second pin is disposed radially of the output sleeve, engages with the first pin, and passes through the slot. A spring biases the first pin toward the PTO shaft so that the spring and an end of the PTO shaft move the first pin so as to selectively locate the second pin at either one and of the slot or the other end of the slot.

As a preferable aspect for selectively connecting one of the high and low speed gears to the output sleeve through the collar, on the assumption that one of the high and low speed gears is disposed further outward than the other so as to serve as an outer gear and the other serves as an inner gear, a boss portion of the outer gear is extended along the output sleeve toward said collar so that a toothed portion is formed on the outer peripheral surface of the extended boss portion thereof. Correspondingly, a toothed portion is formed on the inner peripheral surface of the collar so as to be enabled to mesh with the toothed portion of the outer gear. A bearing is interposed between the inner gear and the boss portion of the outer gear so as to freely rotatably dispose the inner gear around the boss portion of the outer gear. The inner gear has a projecting portion which projects from the bearing along the output sleeve toward the collar. A toothed portion is formed on the inner peripheral surface of the projecting portion of the inner gear, and correspondingly, a toothed portion is formed on the outer peripheral surface of the collar so as to be enabled to mesh with the toothed portion of the inner gear. In this construction, the two toothed portions of the collar are formed on the outer and inner peripheral surfaces, respectively, thereby reducing the sliding range of the collar in comparison with the case where the two toothed portions of the collar are formed on one of the outer and inner peripheral surfaces thereof. Thus, the axial length of the output sleeve is allowed to be extremely reduced.

These, other and further objects, features and advantages of the present invention will appear more fully from the following description taken in connection with the accompanying drawings.

DETAILED DESCRIPTION OF THE INVENTION

Figure 1:
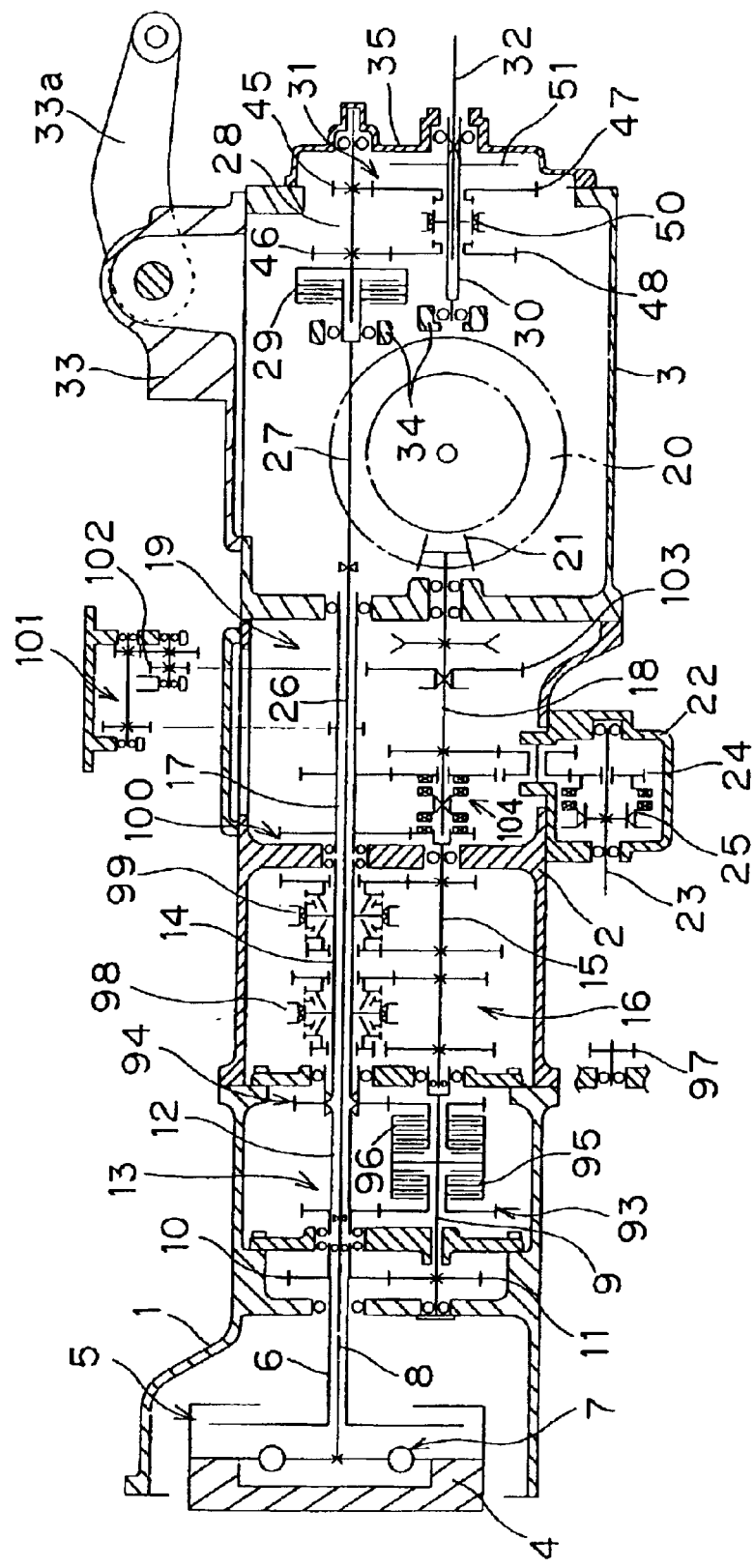
FIG. 1 is a diagram of a transmission system of a tractor with a first embodiment of the present invention.

Description will be given of a first embodiment of the present invention shown in FIGS. 1–11. Referring to a transmission system of a tractor shown in FIG. 1, a front housing 1, a main housing 2 and a rear housing 3 are continuously joined to one another from ahead to behind so as to constitute a transmission housing of the tractor.

Front housing 1 incorporates an engine flywheel 4 at the foremost area therein, a main traveling-driving sleeve 6 connected to flywheel 4 through a main clutch 5, and a main PTO-driving shaft 8 connected to flywheel 4 through a buffering coupler 7.

A driving shaft 9 is disposed below sleeve 6. Sleeve 6 and shaft 9 are drivingly connected to each other through mutually meshing gears 10 and 11. A driven sleeve 12 is disposed coaxially with sleeve 6. A high/low speed changing assembly 13 is interposed between driving shaft 9 and driven sleeve 12. In a front half area of main housing 2, a driving sleeve 14 is disposed coaxially to driven sleeve 12 and connected thereto, a driven shaft 15 is disposed coaxially to driving shaft 9, and a main speed changing arrangement 16 is interposed between driving sleeve 14 and driven shaft 15. In a rear half area of main housing 2, a sub speed changing arrangement 19 including a counter sleeve 17 disposed coaxially to driving sleeve 14 is interposed between driven shaft 15 and a propeller shaft 18 disposed coaxially to driven shaft 15. A rear end portion of propeller shaft 18 is extended into rear housing 3 so as to be provided thereon with a bevel pinion 21 meshing with a diametrically large input gear 20 of a differential unit (not shown) for right and left rear wheels (not shown), thereby driving the right and left rear wheels for traveling of the vehicle.

Right and left front wheels are also driven at need. On a bottom surface of main housing 2 is attached a power take-off casing 22 for driving the front wheels, in which a front-wheel driving power take-off shaft 23, a gear 24 freely rotatably provided on power take-off shaft 23 so as to be driven by propeller shaft 18, and a front-wheel driving clutch 25 for selectively making gear 24 engage with power take-off shaft 23 are disposed.

For making a rear PTO driving system, main driving shaft 8 and a transmission shaft 26 are disposed coaxially and connected to each other. Transmission shaft 26 is extended rearward into rear housing 3 through the sleeves for traveling, i.e., main driving sleeve 6, driven sleeve 12, driving sleeve 14 and counter sleeve 17. In the rear half area of rear housing 3, a PTO clutch 29 is interposed between another transmission shaft 27 connected to transmission shaft 26 and a clutch shaft 28 disposed coaxially to transmission shaft 27, and a PTO speed changing arrangement 31 is interposed between clutch shaft 28 and an output sleeve 30 disposed below clutch shaft 28. A (rear) PTO shaft 32 is removably inserted into output sleeve 30 so as to be joined with output sleeve 30 and extended rearwardly outward from rear housing 3.

On the top surface of rear housing 3 is disposed a hydraulic lift unit 33 provided with right and left lift arms 33a for raising and lowering a working implement such as a rotary cultivator, which is connected to the rear of the tractor and driven by PTO shaft 32.

Rear housing 3 is integrally provided in an intermediate portion thereof with a supporting wall 34. Rear housing 3 is open at the rear end thereof and closed by a cover 35. As clearly shown in FIG. 2, a rear end of transmission shaft 27 is supported by supporting wall 34, and clutch shaft 28 is supported between transmission shaft 27 and cover 35 while a front end of clutch shaft 28 being inserted into the rear end of transmission shaft 27. Output sleeve 30 is supported at both ends thereof by supporting wall 34 and cover 35.

PTO shaft 32 has opposite splined ends 32a and 32b to be selectively fit with a universal joint (not shown) of the working implement. Splined ends 32a and 32b are different from each other in number of teeth thereof. PTO shaft 32 is provided at an intermediate portion thereof between splined ends 32a and 32b with a splined hub 32c. PTO shaft 32 is fro-and-aft-reversibly inserted at one of splined ends 32a and 32b thereof into output sleeve 30 so as to make splined hub 32c mesh with a splined portion 30a formed on an inner peripheral surface of output sleeve 30, thereby being connected to output sleeve 30 so as to be rotated integrally with output sleeve 30.

Figure 2:
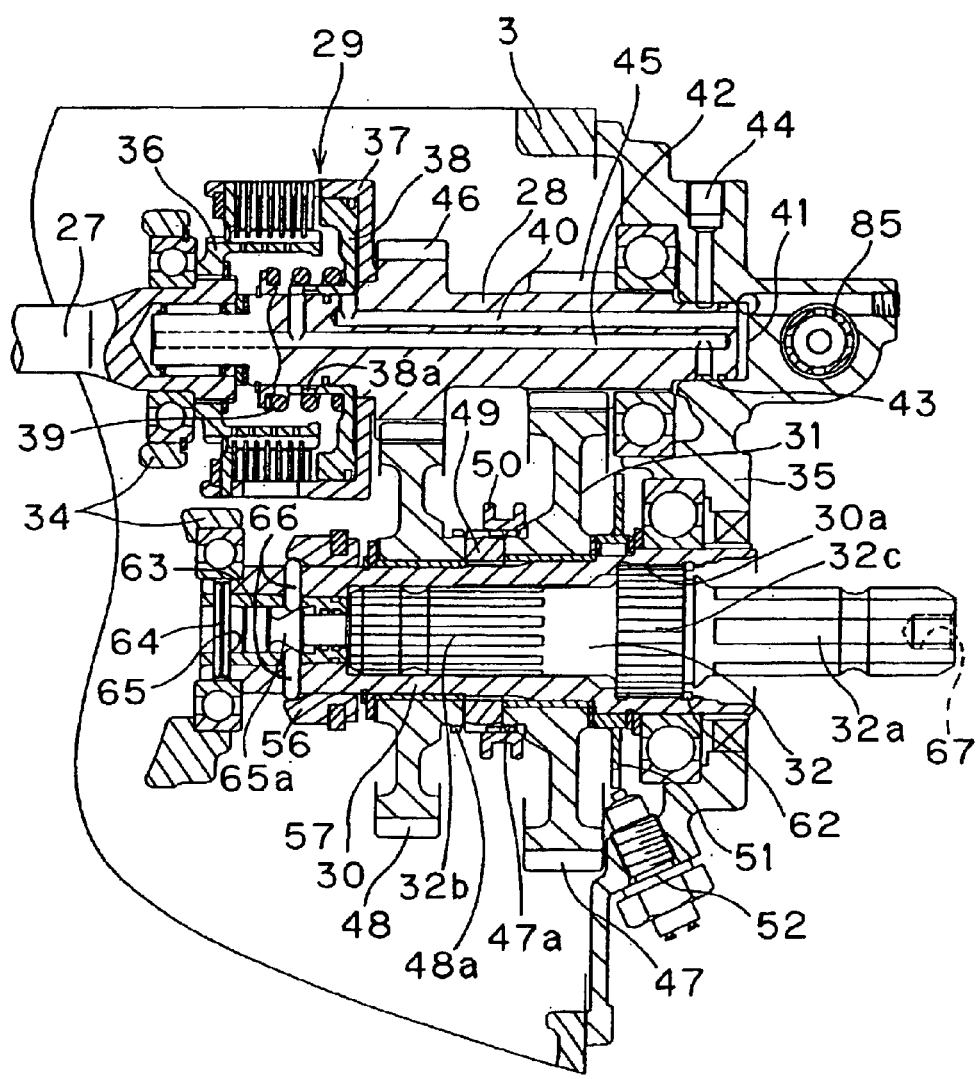
FIG. 2 is a sectional side view of a rear half area of a rear housing of the same tractor showing the first embodiment.

As shown in FIG. 2, for constituting PTO clutch 29, a rotary supporting member 36 is fixed on the rear end of transmission shaft 27, a clutch housing 37 is fixed on the front end of clutch shaft 28, and plurality of friction elements are not-relatively rotatably but slidably supported to rotary supporting member 36 and clutch housing 37, respectively. In clutch housing 37 is disposed a piston 38 which is biased to retreat by a spring 39. PTO clutch 29 is a multi-friction-plate hydraulic clutch in which hydraulic oil pressure pushes piston 38 against spring 39 so as to press the friction elements against one another, thereby being engaged.

In clutch shaft 28 is formed a hydraulic oil passage 40 which is open behind piston 38. A base end of hydraulic oil passage 40 is open to an oil chamber 41 behind clutch shaft 28. In clutch shaft 28 is also formed a lubricating oil passage 42 for feeding the friction elements with lubricating oil. An open end of lubricating oil passage 42 toward the interior of clutch housing 37 is closed by piston 38 in the shown unclutched state, and opened by an oil hole 38a formed in piston 38 in a clutching state where piston 38 is advanced. A base end of lubricating oil passage 42 is open to an annular oil chamber 43 formed between clutch shaft 28 and cover 35. A lubricating oil port 44 is provided in cover 35 so as to be connected to oil chamber 43.

As shown in FIG. 2, for constituting PTO speed changing arrangement 31, gears 45 and 46 are provided fixedly on clutch shaft 28, and gears 47 and 48 freely rotatably on output sleeve 30. Gear 45 meshes with gear 47, and gear 46 with gear 48. A splined ring 49 is fit around output sleeve 30 between gears 47 and 48, and a shifter collar 50 is not-relatively rotatably provided around splined ring 49. The boss portions of gears 47 and 48 are toothed so as to serve as respective toothed portions 47a and 48a. Shifter collar 50 is splined correspondingly at an inner peripheral surface thereof so as to be enabled to mesh with either toothed portion 47a or 48a. By selectively sliding shifter collar 50 to fix gear 47 to output sleeve 30 through toothed portion 47a, output sleeve 30 gets a first speed ratio (540 rpm). If gear 48 is fixed to output sleeve 30 through toothed portion 48a by sliding shifter collar 50, output sleeve 30 gets a second speed ratio (1000 rpm).

A toothed ring 51 is fixed around output sleeve 30 in cover 35. A rotary pickup 52 supported by cover 35 confronts toothed ring 51 so as to detect the rotary speed of output sleeve 30, i.e., PTO shaft 32.

Figure 3:
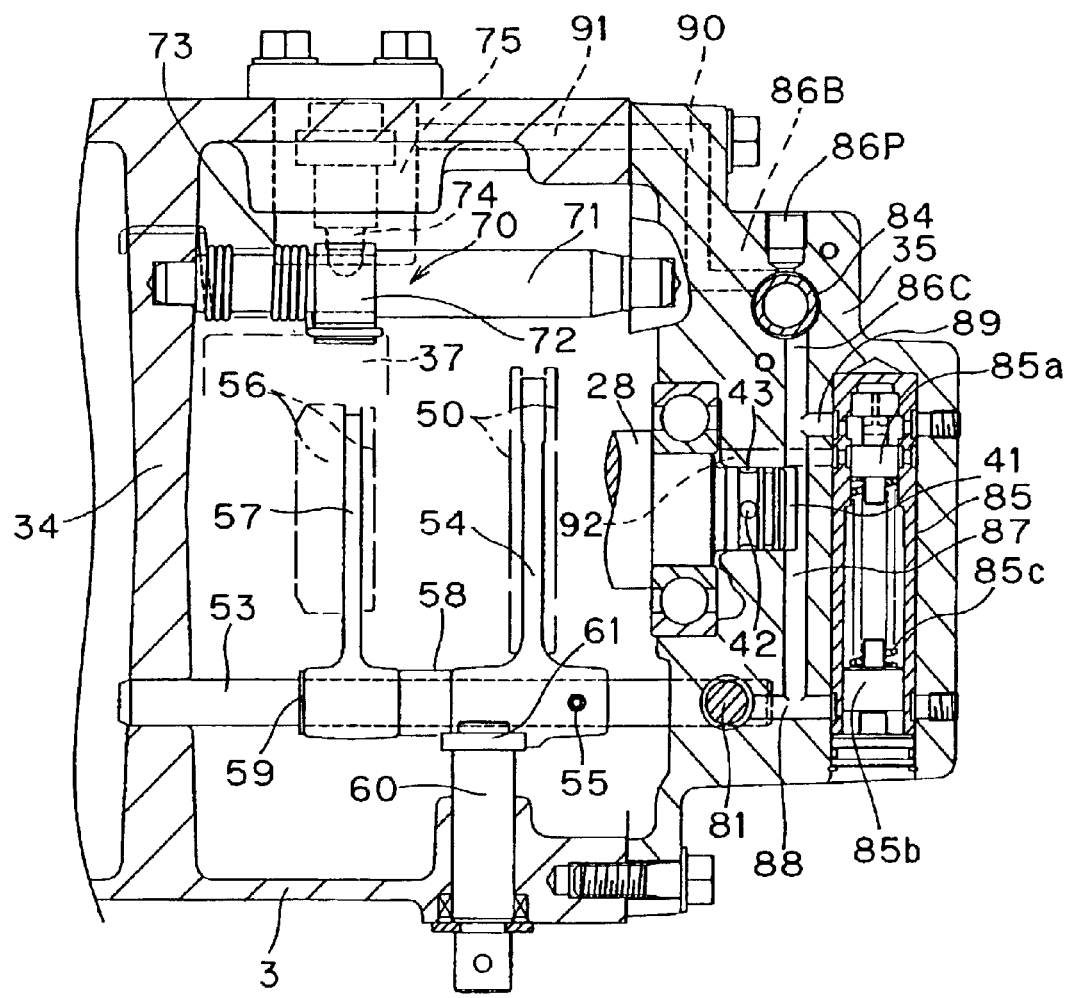
FIG. 3 is a sectional plan view of the same.
Figure 4:
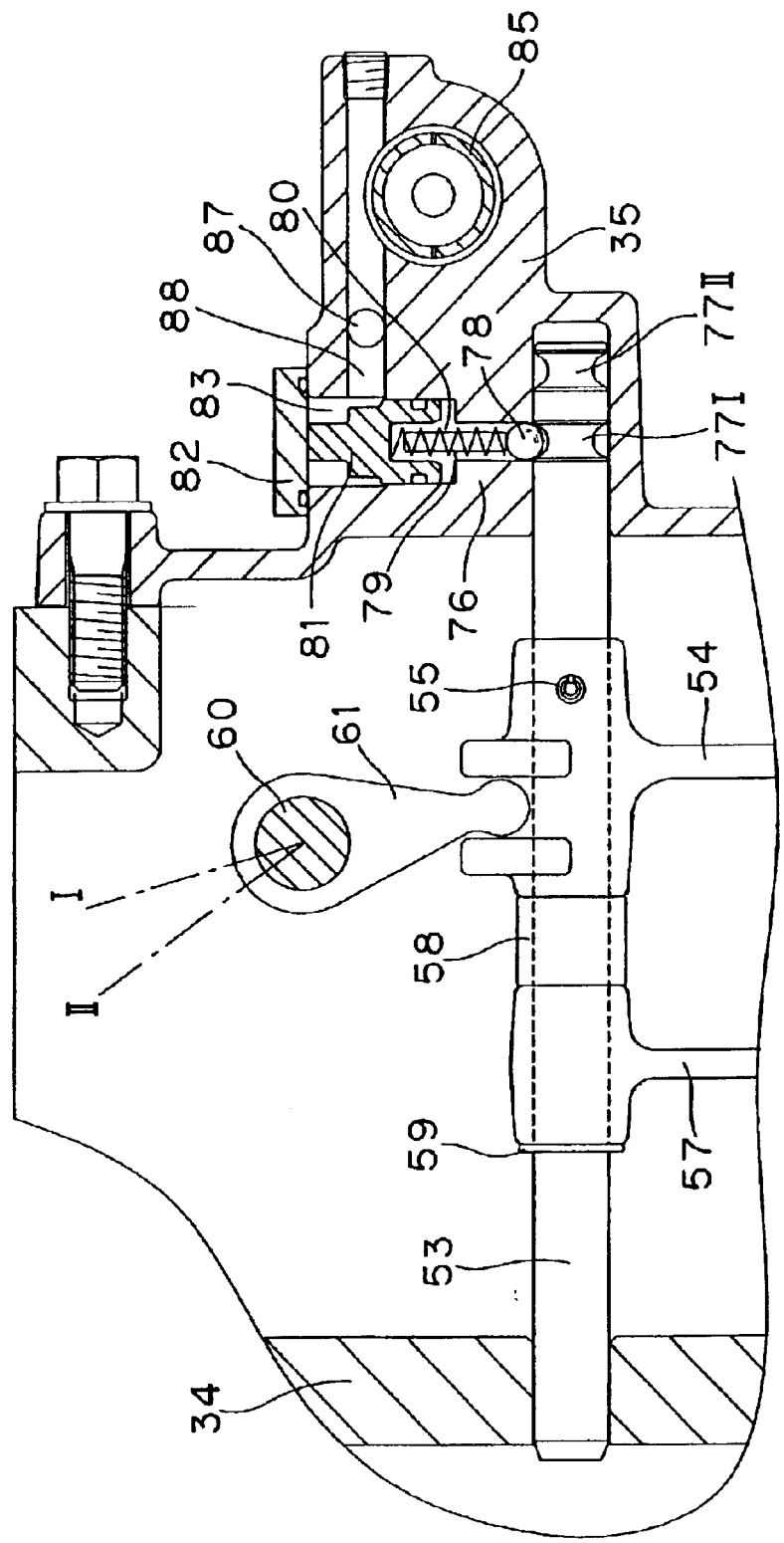
FIG. 4 is a fragmentary sectional side view of the same taken along a section other than that of FIG. 2.

As shown in FIGS. 3 and 4, a fork shaft 53 is slidably supported at both ends thereof by supporting wall 34 and cover 35. A shift fork 54 engages with shifter collar 50, and is attached to fork shaft 53 through a pin 55. As shown in FIG. 2, a second collar 56 is slidably disposed around output sleeve 30 inward of gear 48 in the axial direction of output sleeve 30. As shown in FIGS. 3 and 4, a second fork 57 engages with collar 56 and is supported by fork shaft 53. On fork shaft 53, a spacer sleeve 58 is interposed between shift fork 54 and fork 57, and a retaining ring 59 is disposed at an end of fork 57, so as to make fork 57 slide integrally with fork shaft 53 and shift fork 54. Fork 57 is rotatable around the axis of fork shaft 53. Fork 57 and collar 56 do not need to coincide with each other in phase during assembly, as the only requirement for fitting fork 57 to collar 56 is rotate fork 57 considerably.

A speed control shaft 60 rotated by manipulation of a speed changing device such as a lever or a pedal (not shown) is disposed so as to penetrate a side wall of rear housing 3. A control arm 61 fixed onto an inner end of side shaft 60 so as to engage with shift fork 54. Shaft 60 and arm 61 are provided with a first speed position I and a second speed position II, as shown in FIG. 4, so as to set shifter collar 50 to its respective first and second positions.

Figure 5:
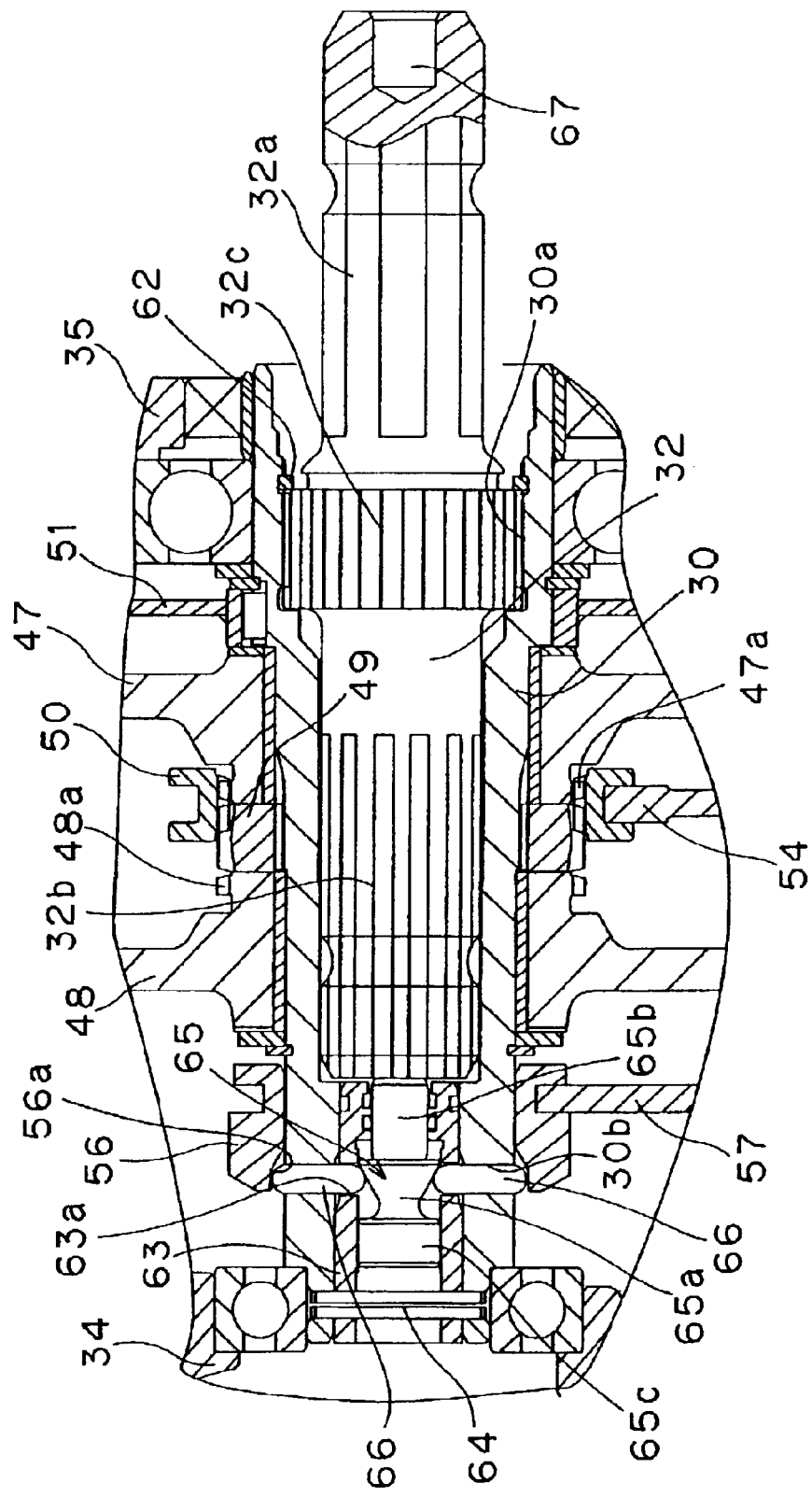
FIG. 5 is a fragmentary sectional side view of the same as an enlarged view of a part of FIG. 2.
Figure 6:
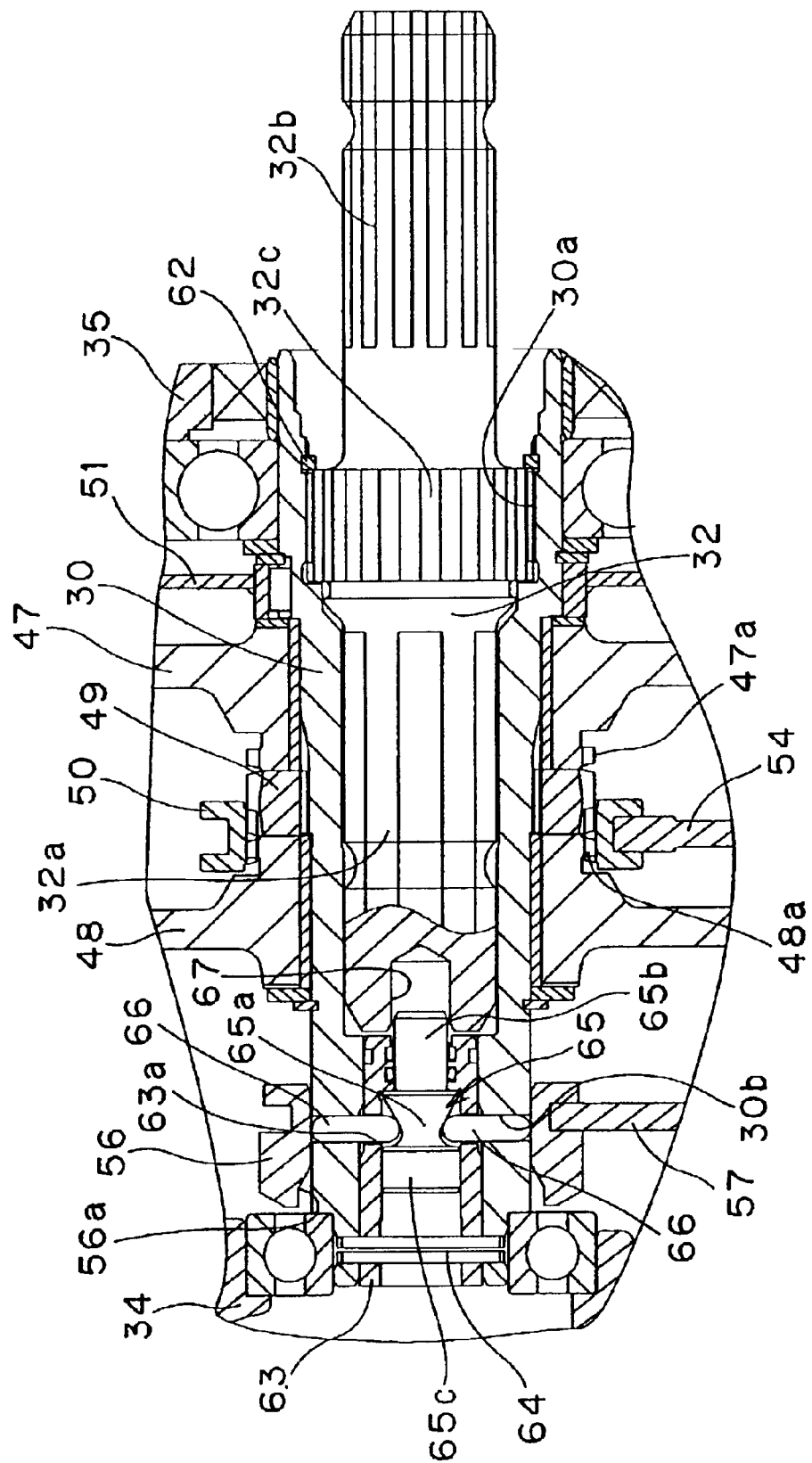
FIG. 6 is a sectional side view of the same with FIG. 5 in a different state.

FIGS. 2 and 5 show that PTO shaft 32 is inserted into output sleeve 30 so as to make splined end 32a having the smaller number of teeth (six teeth) project outward. FIG. 6 shows that PTO shaft 32 is inserted into output sleeve 30 so as to make splined end 32b having the larger number of teeth (twenty one teeth) project outward. In either of the two cases, a retaining ring 62 is fitted into an annular retaining ring groove 30c formed on the inner peripheral surface of output sleeve 30 at the outer end of splined portion 30a so as to abut against the outer end of splined hub 32c, thereby preventing PTO shaft 32 from escaping.

An actuator is so constructed as follows so as to set PTO speed changing arrangement 31 into a first speed mode (540 rpm) in the case of FIGS. 2 and 5, and into a second speed mode (1000 rpm) in the case of FIG. 6. As shown in FIGS. 2, 5 and 6, a sleeve 63 is fixedly fitted onto the inner end of output sleeve 30 through a pin 64. A sensor 65 is formed at one end portion thereof toward PTO shaft 32 with a diametrically small portion 65b, at the other end portion thereof with a diametrically large portion 65c, and at an intermediate portion thereof between portions 65b and 65c with a cam surface 65a which is slant in the axial direction of sensor 65. Sensor 65 is inserted into sleeve 63 so that diametrically small and large portions 65b and 65c slidably fit sleeve 63.

A plurality of pins 66, e.g., two pins 66 are disposed radially with respect to output sleeve 30, sleeve 63 and sensor 65. Pins 66 slidably penetrate output sleeve 30 and sleeve 63 through holes 30b and 63a, which are formed in output sleeve 30 and sleeve 63 respectively, so as to abut against cam surface 65a of sensor 65 and the inner peripheral surface of collar 56. The inner peripheral edge of base end of collar 56 is recessed so as to serve as a recess 56a, into which pins 66 projecting out of output sleeve 30 are inserted so as to restrain the sliding of collar 56.

A hole 67 is bored into PTO shaft 32 from an end surface of splined end 32a having the fewer number of teeth. When splined end 32a is inserted into output sleeve 30, as shown in FIG. 6, diametrically small portion 65b of sensor 65 is fitted into hole 67.

Due to adequately setting the length of PTO shaft 32, when splined end 32b having many teeth is inserted into output sleeve 30 as shown in FIGS. 2 and 5, the inner end of PTO shaft 32 pushes the end of diametrically small portion 65b of sensor 65 so that a diametrically larger portion of cam surface 65a pushes pins 66 so as to make pins 66 project outward from output sleeve 30. Also, when splined end 32a having fewer teeth is inserted into output sleeve 30 as shown in FIG. 6, diametrically small portion 65b of sensor 65 is inserted into hole 67 at the end of PTO shaft 32 so that a diametrically smaller portion of cam surface 65a abuts against pins 66 so as to make pins 66 fall into output sleeve 30.

In the case of FIGS. 2 and 5, pins 66 are inserted into recess 56a of collar 56 so as to prevent collar 56 from sliding from the shown position, thereby preventing fork 57 and shift fork 54 shown in FIGS. 3 and 4, which are integrated in sliding, from sliding. Thus, shifter collar 50 is held at the first speed position shown in FIGS. 2 and 5.

In the case of FIG. 6, collar 56 is allowed to freely slide on output sleeve 30 because pins 66 fall in output sleeve 30.

Accordingly, shift fork 54 and fork 57 can be operated for shifting so as to move shifter collar 50 from the second speed position shown in FIG. 6 to the first speed position shown in FIGS. 2 and 5.

Figure 7:
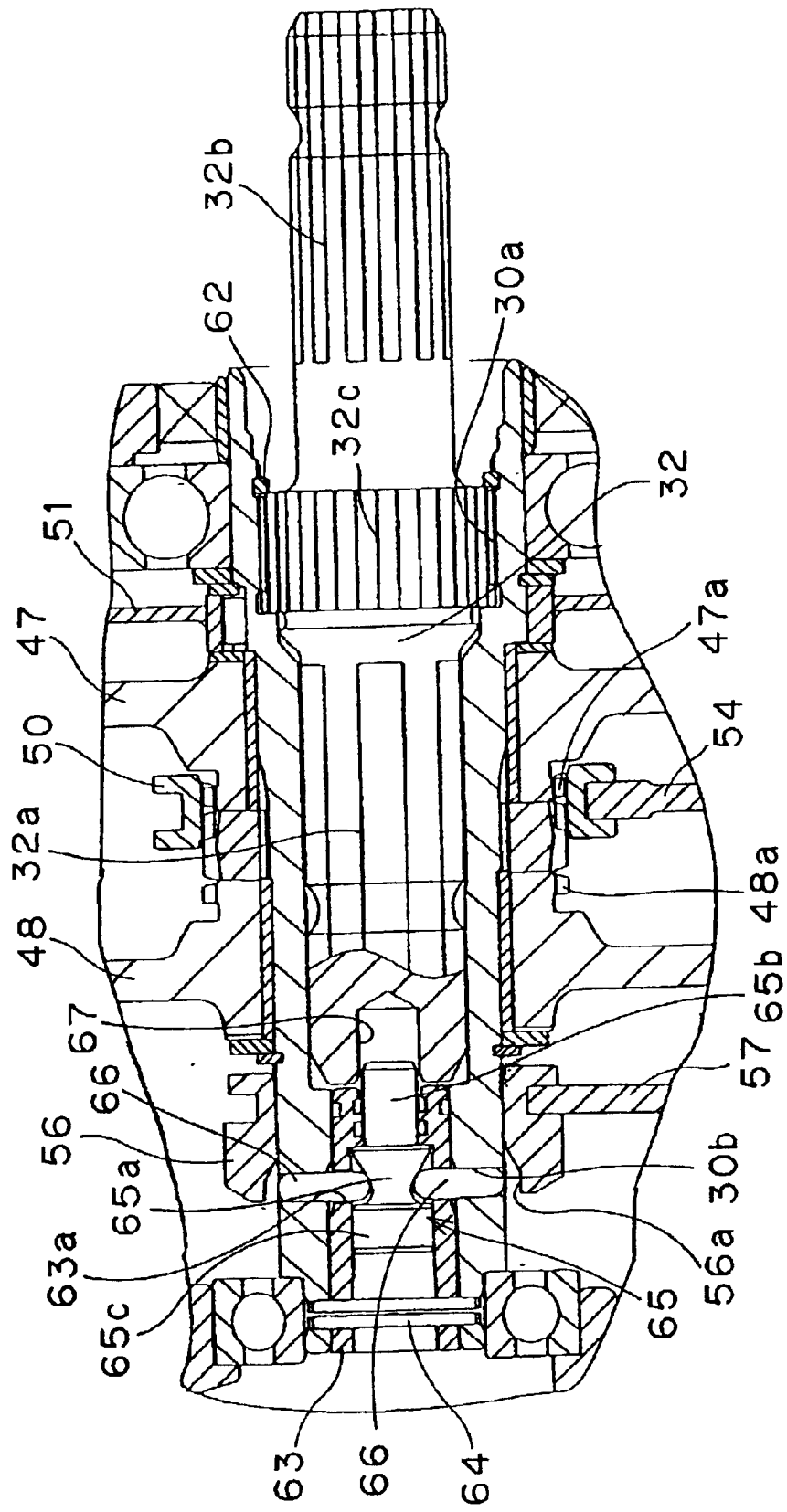
FIG. 7 is a sectional side view of the same while an intermediate process from the state of FIG. 6 to the state of FIG. 5.

In detail, if PTO shaft 32, which has been in the state of FIG. 6, is going to be reversed between its front and rear ends so as to be oriented into the state of FIG. 5 and inserted into output sleeve 30, the unshown speed changing device is manipulated so as to slide shifter collar 50 and collar 56 to the position of FIG. 5, as shown in FIG. 7, and then, PTO shaft 32 is reversed. At this time, as shown in FIG. 5, sensor 65 is pushed by the end surface of PTO shaft 32 so that pins 66 project outward from output sleeve 30 and enter recess 56a of collar 56. Thus, collar 56 and shifter collar 50 are located at the first speed position as mentioned above.

Figure 8:
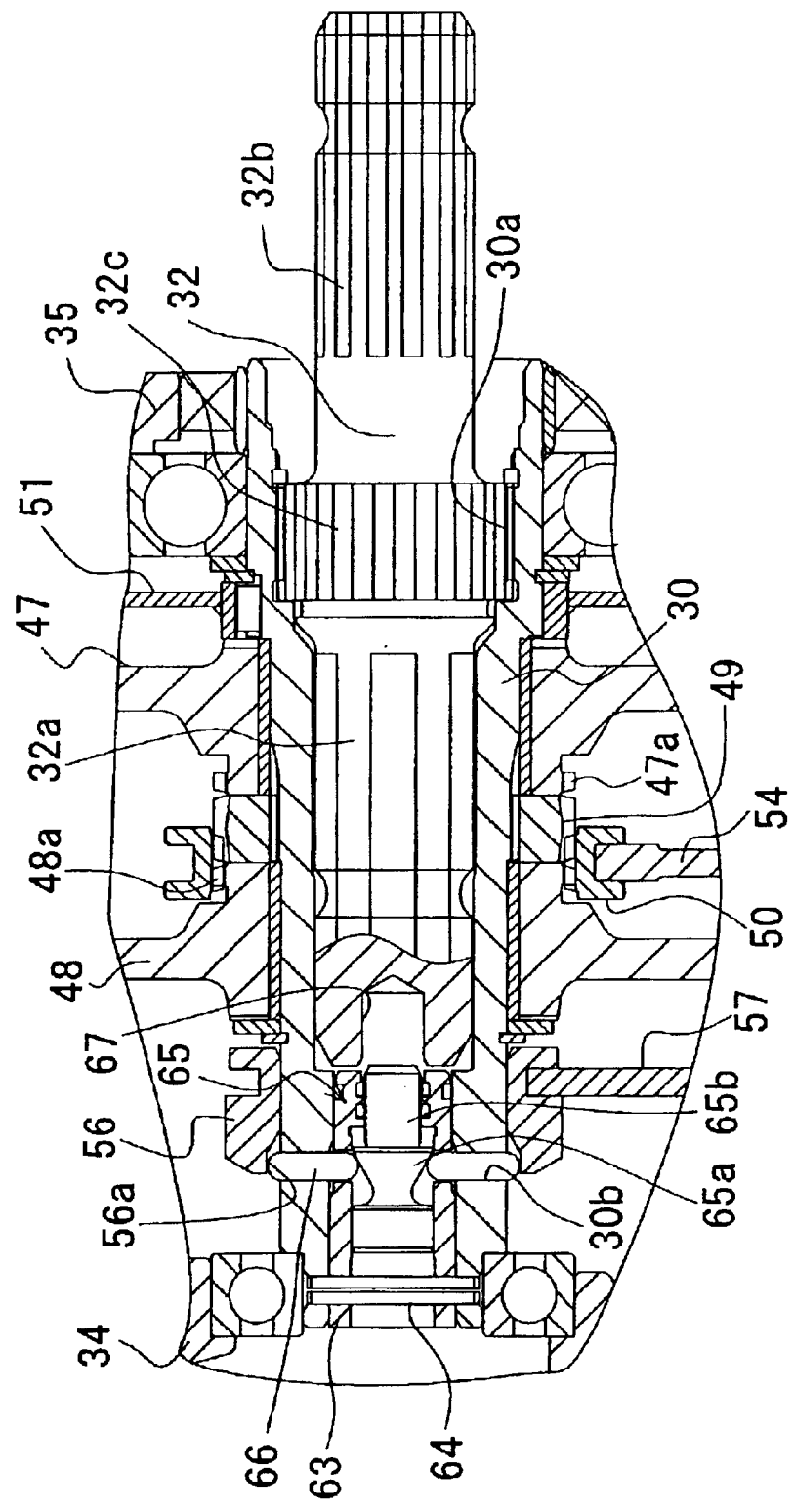
FIG. 8 is a sectional side view of the same while an intermediate process from the state of FIG. 5 to the state of FIG. 6.

On the other hand, if PTO shaft 32, which has been in the state of FIG. 5, is going to be reversed so as to be oriented into the state of FIG. 6 and inserted into output sleeve 30, PTO shaft 32 is inserted into output sleeve 30 in such a state as shown in FIG. 8 that diametrically small portion 65b of sensor 65 confronts hole 67 of PTO shaft 32 while being allowed to be easily inserted into hole 67. Then, by manipulating the speed changing device, shifter collar 50 and collar 56 slide to their second speed position shown in FIG. 6 while collars 50 and 56 are pushing pins 66 into output sleeve 30 and moving sensor 65 rightward (in FIG. 6).

Figure 9:
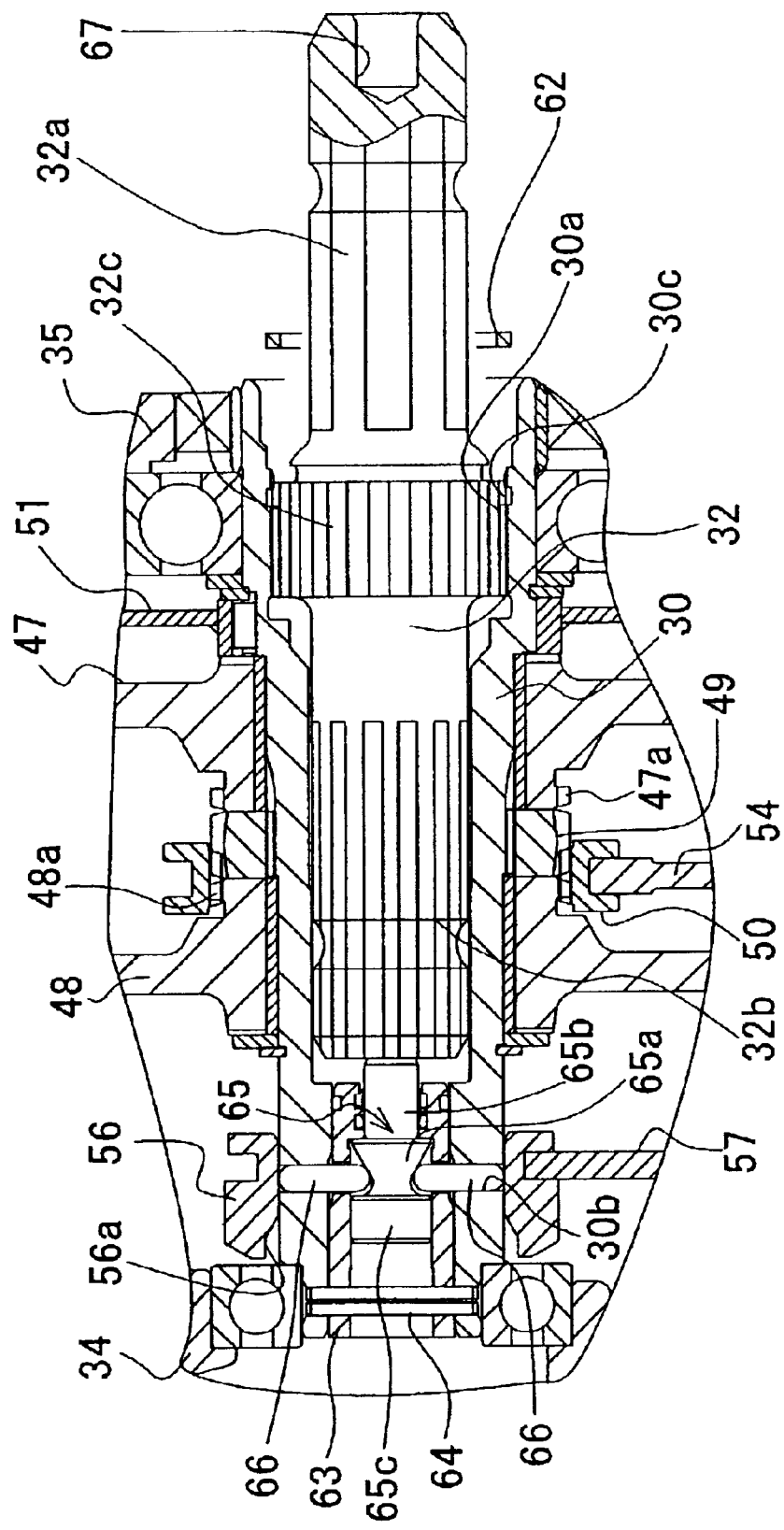
FIG. 9 is a sectional side view of the same while the PTO shaft is unexpectedly inserted.

As shown in FIG. 9, if splined end 32b having the many teeth is inserted into output sleeve 30 while shifter collar 50 and collar 56 being positioned so as to make high speed gear 48 engage with output sleeve 30, the end surface of PTO shaft 32 comes to abut against diametrically small portion 65b of sensor 65 so that splined end 32b is prevented from being inserted into output sleeve 30 to the proper depth. Simultaneously, groove 30c on the inner peripheral surface of output sleeve 30 confronts splined hub 32c of PTO shaft 32 so as to prevent retaining ring 62 from being fitted into groove 30c for retaining PTO shaft 32 in output sleeve 30. In short, unless shifter collar 50 and collar 56 which have been located so as to make high speed gear 48 engage with output sleeve 30 are moved so as to make low speed gear 47 engage with output sleeve 30, splined end 32b having the many teeth is prevented from being inserted into output sleeve 30 to the proper depth, thereby ensuring safety.

Figure 12:
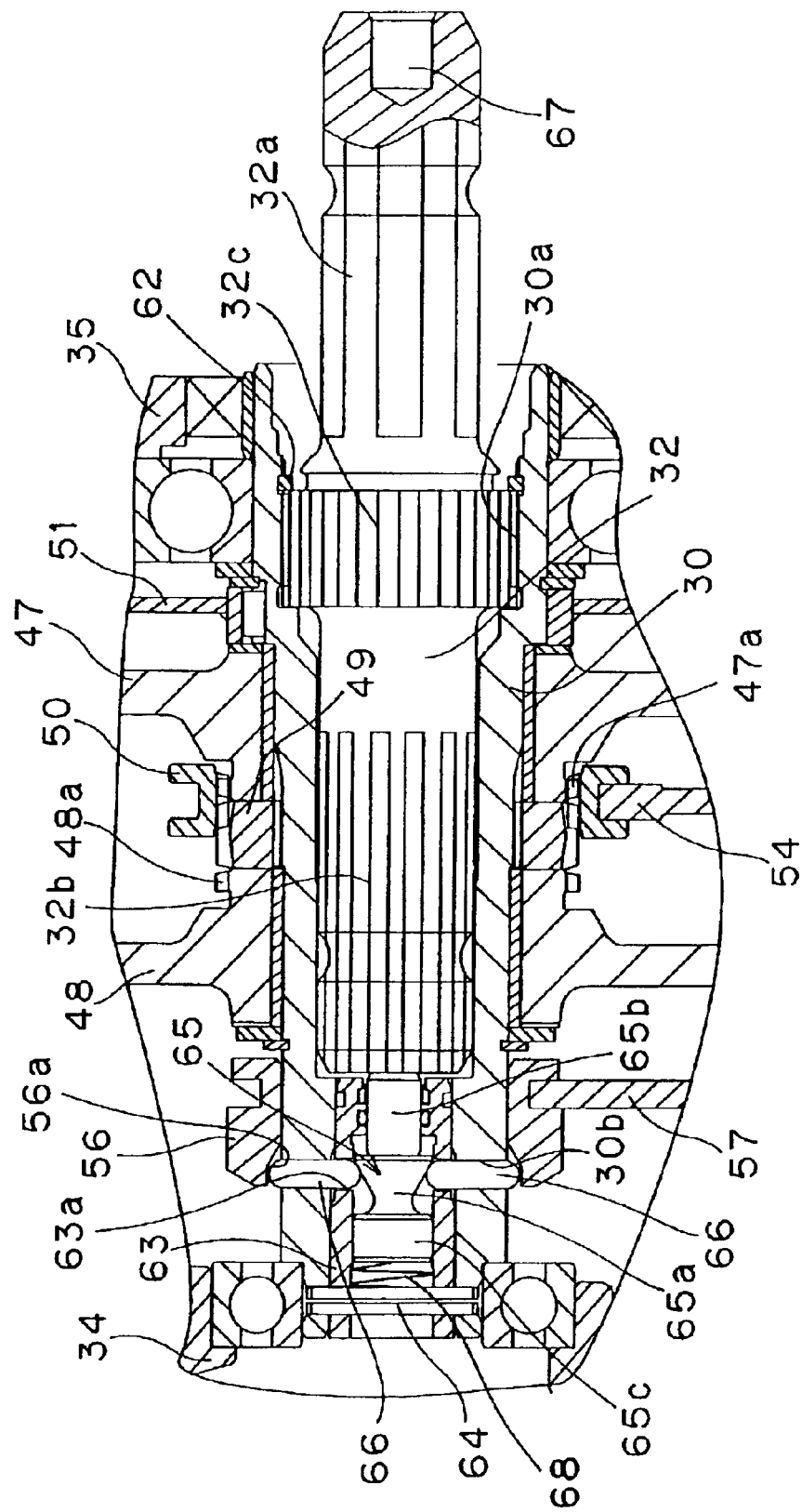
FIG. 12 is a sectional side view of a rear half area of the rear housing of the tractor according to a modification of the first embodiment of FIG. 1, at a situation corresponding to that of FIG. 5.
Figure 13:
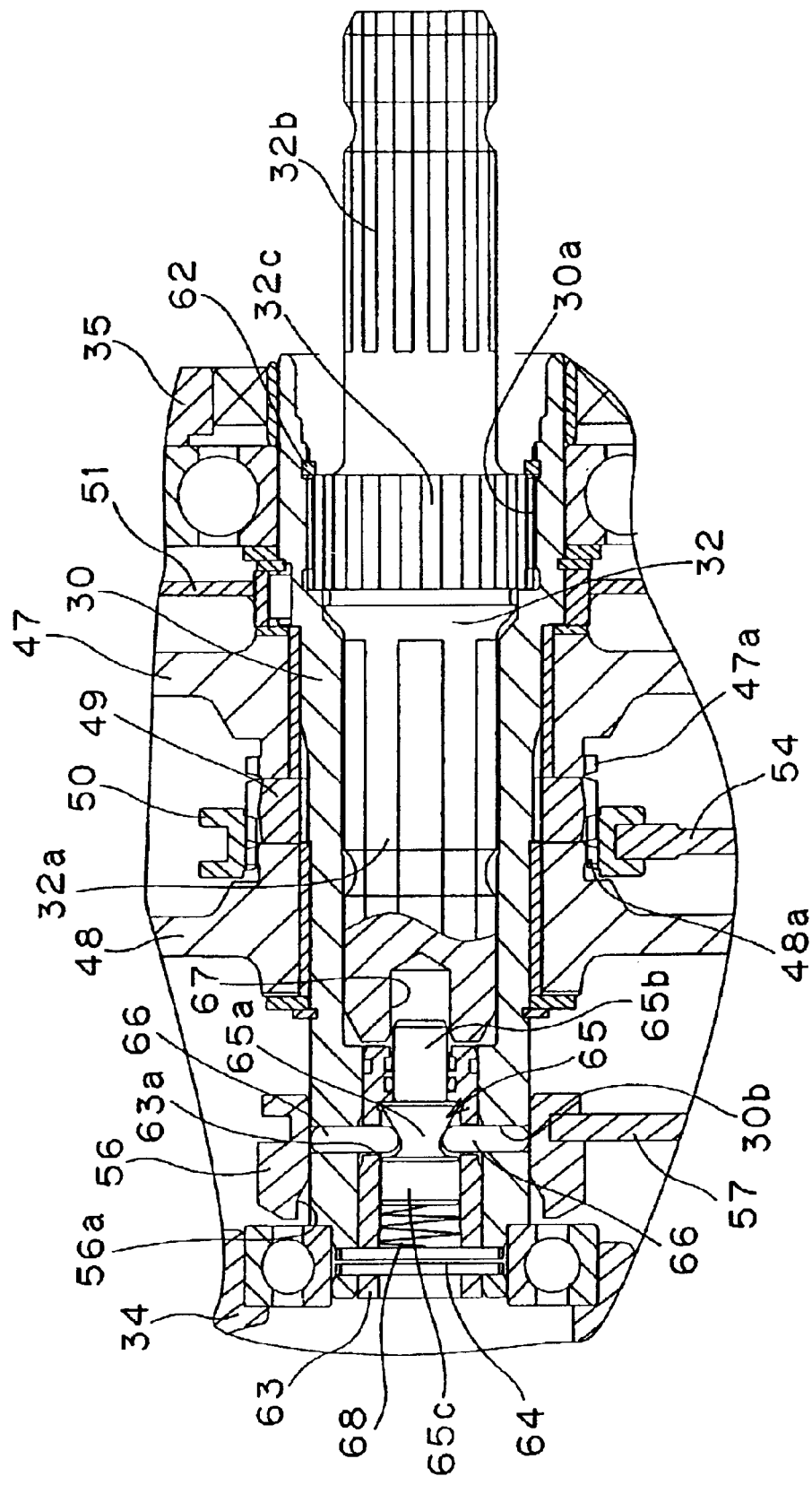
FIG. 13 is a sectional side view of the same at a state that is different from the state of FIG. 12.

In addition, as shown in FIGS. 12 and 13, a compressed spring 68 may be disposed between sensor 65 and pin 64 so as to bias sensor 65 rightward (in FIGS. 12 and 13). Due to this arrangement, if PTO shaft 32 is reversed from the state of FIG. 12 to the state of FIG. 13 and inserted into output sleeve 30, sensor 65 is quickly set into the position of FIG. 13. Then, collar 56 and shifter collar 50 are allowed to be moved to the second speed position by manipulation of the speed changing device.

Description will be given of other parts in the transmission of the tractor. As shown in FIG. 3, in clutch housing 37 of PTO clutch 29 is disposed a brake 70, which quickly stops an inertial rotation of the followers of PTO clutch 29 so as to prevent the rotation of the friction elements when PTO clutch 29 is disengaged. For constituting brake 70, a brake supporting shaft 71 is supported at both ends thereof by supporting wall 34 and cover 35 and rotatably supports a brake shoe 72. A spring 73 is wounded around shaft 71 and engages at both ends thereof with shoe 72 and supporting wall 34 so as to bias brake shoe 72 apart from the outer peripheral surface of clutch housing 37. A hydraulic cylinder 75 is attached to a side wall of rear housing 3. Hydraulic cylinder 75 includes a piston 74 abutting against a free end portion of brake shoe 72. Brake 70 is applied by hydraulically actuating hydraulic cylinder 75 so that piston 74 advances to press brake shoe 72 against the outer peripheral surface of clutch housing 37.

As shown in FIG. 4, fork shaft 53 is provided thereon with a shift lock assembly 76 which prevents fork shaft 53 from sliding when PTO clutch 29 is engaged. For constituting shift lock assembly 76, on fork shaft 53 are formed two annular grooves 77I and 77II, and in cover 35 are disposed a rod 79, a spring 80 wound around rod 79, and a ball 78 biased by spring 80 so as to be selectively fitted into one of grooves 77I and 77II. A piston 81 is disposed in a hole formed within cover 35 so as to receive a base end of spring 80. A lid 82 closes an open end of the hole in which piston 81 is disposed so that the hole serves as an oil chamber 83.

When PTO clutch 29 is engaged, in oil chamber 83 arises hydraulic pressure so that piston 81 moves toward ball 78 till rod 79 comes to be fixedly sandwiched between piston 81 and ball 78, whereby ball 78 is engaged into either groove 77I or 77II so as to prevent fork shaft 53 from sliding. Thus, fork shaft 53 is held at either the first or second speed position, and PTO speed changing arrangement 31 is locked. When hydraulic pressure does not arise in oil chamber 83 by disengaging PTO clutch 29, ball 78 and spring 80 restrain fork shaft 53 but allow it to slide. Thus, at this time, ball 78 and spring 80 serve as a detent assembly.

Figure 10:
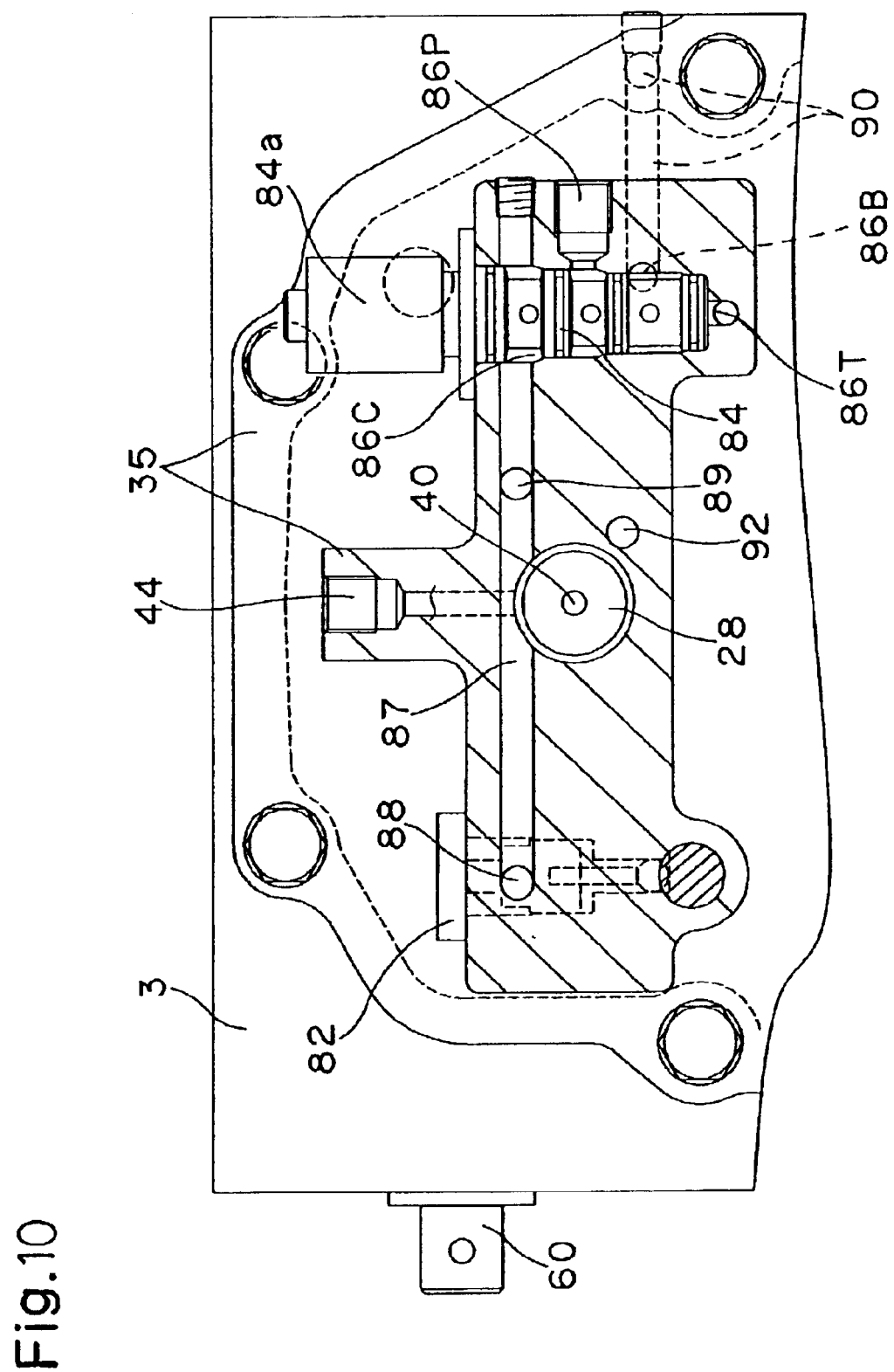
FIG. 10 is a sectional rear view of a part of the rear half area of the rear housing.

As shown in FIG. 10, in cover 35 is vertically disposed an electromagnetic switching valve 84 for PTO clutch 29. Also, as shown in FIGS. 2 and 3, in a rear projecting portion of cover 35 is laterally horizontally disposed a modulate relief valve 85 which gradually increases hydraulic oil pressure for PTO clutch 29 from the time when switching valve 84 is switched from its neutral state to its actuating state. Switching valve 84 is provided with a pump port 86P, a clutch port 86C, a brake port 86B and a tank port 86T which is open into cover 35. When switching valve 84 is located at the neutral position shown in FIG. 10, pump port 86P communicates with brake port 86B, and clutch port 86C with tank port 86T. When a solenoid 84a is energized so as to lift up switching valve 84 to the actuating position, pump port 86P communicates with clutch port 86C, and brake port 86B with tank port 86T. As usual, modulate relief valve 85 comprises a valve member 85a, a piston 85b, and a spring 85c for setting hydraulic pressure interposed between valve member 85a and piston 85b.

As shown in FIGS. 3 and 10, clutch port 86C of switching valve 84 communicates with oil chamber 41 at the end of clutch shaft 28 through a lateral oil path 87 within cover 35. Clutch port 86C also communicates with modulate relief valve 85 at the lateral outsides of valve member 85a and piston 85b through oil path 87 and oil paths 89 and 88 disposed in the fro-and-aft direction, respectively. Brake port 86B communicates with hydraulic cylinder 75 for actuating brake 70 through an oil path 90 within cover 35 and an oil path 91 within the side wall of rear housing 3. Furthermore, a relief port 92 of modulate relief valve 85 is formed within cover 35 so as to be open into rear cover 3.

For constituting high/low speed changing arrangement 13 shown in FIG. 1, a high speed gear train 93 and a low speed gear train 94 are interposed between driving shaft 9 and driven sleeve 12. A high speed hydraulic clutch 95 and a low speed hydraulic clutch 96 are disposed on driving shaft 9 so as to selectively make one of two gears of respective gear trains 93 and 94 freely rotatably provided on driving shaft 9 engage with driving shaft 9, thereby switching the rotary speed of driven sleeve 12 between high and low.

As disclosed in Japanese Laid Open Gazette No. 2000-352446, however not shown in the present drawings, low speed hydraulic clutch 96 is a spring load clutch, which is engaged by a spring and disengaged by hydraulic pressure. For speed changing operation, through a single oil passage within driving shaft 9, hydraulic oil is fed into one of hydraulic clutches 95 and 96 and drained from the other simultaneously.

For constituting main speed changing arrangement 16 shown in FIG. 1, four speed gear trains are interposed between driving sleeve 14 and driven shaft 15. One of the speed gear trains includes an intermediate idler gear 97. Thus, main speed changing arrangement 16 provides three forward traveling speed stages and one backward traveling speed stage. The four gear trains are provided with four respective gears freely rotatably disposed on driving sleeve 14. A pair of double-actuating synchromesh clutches 98 and 99 are provided on driving sleeve 14 so as to selectively make one of the four gears on driving sleeve 14 engage with driving sleeve 14.

As shown in FIG. 1, counter sleeve 17 of sub speed changing arrangement 19 is connected to driven shaft 15 of main speed changing arrangement 15 through a deceleration gear train 100. A speed gear 102 driven by one of speed gears disposed on counter sleeve 17 through a deceleration gear assembly 101 is disposed out of counter sleeve 17. A shift gear 103 and a double-actuating clutch 104 are selectively slidably provided on propeller shaft 18 so as to constitute sub speed changing arrangement 19 providing four speed stages.

Figure 11:
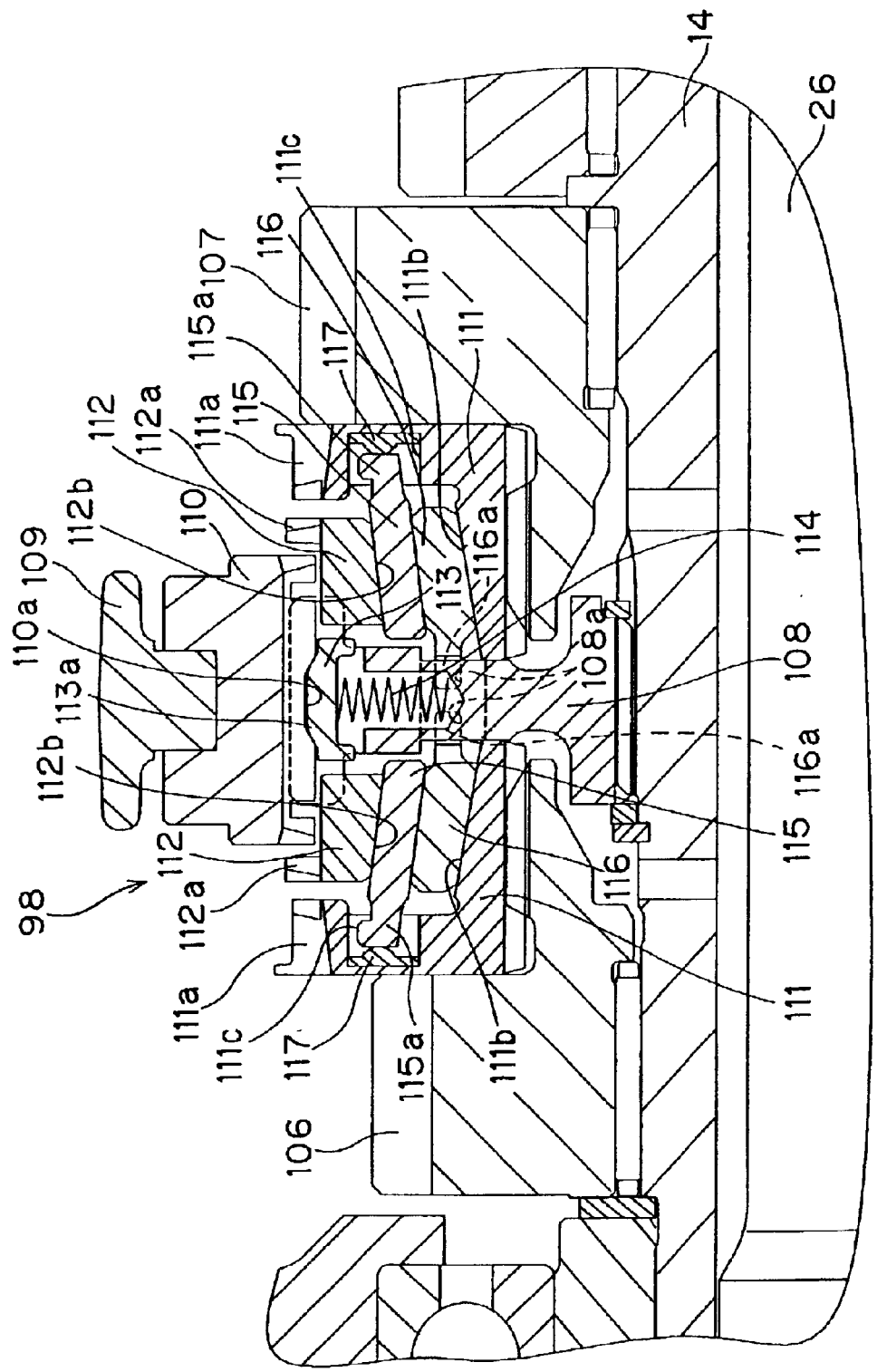
FIG. 11 is a sectional side view of a part of a main speed changing arrangement disposed in the tractor of FIG. 1.

Referring to FIG. 11 showing double-actuating synchromesh clutch 98 (also representing other clutch 99), clutch 98 is interposed on driving sleeve 14 between gears 106 and 107 freely rotatably disposed on driving sleeve 14. As usual, for constituting clutch 98, a splined hub 108 is fixed onto driving sleeve 14 through splines between gears 106 and 107, and a sleeve 110 is axially slidably fitted around hub 108 through splines so as to be slid by a shifter 109. A pair of synchro-cones 111, each of which has a toothed portion 111a and a conic friction surface 111b, is connected to respective gears 106 and 107 through splines. A pair of synchronizer rings 112 having respective conic friction surfaces 112b are disposed so that each of conic friction surfaces 112b face each friction surface 111b. Hub 108 is notched on an outer periphery thereof. A strut 113 having a convex 113a is axially slidably disposed in the notch of hub 108. Strut 113 is biased by a spring 114 supported by hub 108 so that convex 113a is pressed into a recess 110a formed on the inner peripheral surface of sleeve 110 when sleeve 110 is located at its neutral position for separating both gears 106 and 107 from driving sleeve 14.

Particularly, a pair of intermediate cones 115 and a pair of intermediate cones 116 are disposed so that each intermediate cone 115 and each intermediate cone 116 are sandwiched between mutually facing conic friction surfaces 111b of each synchro-cone Ill and conic friction surface 112b of each synchronizer ring 112. Each of intermediate cones 115 is sandwiched between synchronized ring 112 and intermediate cone 116. Projections 115a of respective intermediate cones 115 are inserted into holes Me of respective synchro-cones 111 so as to make intermediate cones 115 rotatable integrally with synchro-cones 111 around the axis of driving sleeve 14. Projections 116a of intermediate cones 116 are inserted into holes 108a of hub 108 so as to make intermediate cones 116 rotatable integrally with hub 108 and driving sleeve 14. As an ordinary synchromesh clutch, either gear 406 or 107 is connected to driving sleeve 14 by sliding sleeve 110 rightward or leftward (in FIG. 11) However, the synchromeshing capacity of clutch 98 having intermediate cones 115 and 116 interposed between conic friction surfaces 111b and 112b is greatly enhanced in comparison with the ordinary synchromesh clutch having none of such intermediate cones. A reverting member 117 made of elastic material such as rubber is stuck to an inner surface of each hole Me of synchro-cone 111. Reverting member 117, which is compressed during synchromeshing operation of clutch 98, reverts after completion of the synchromeshing so as to release intermediate cone 115 from frictional meshing.

Figure 14:
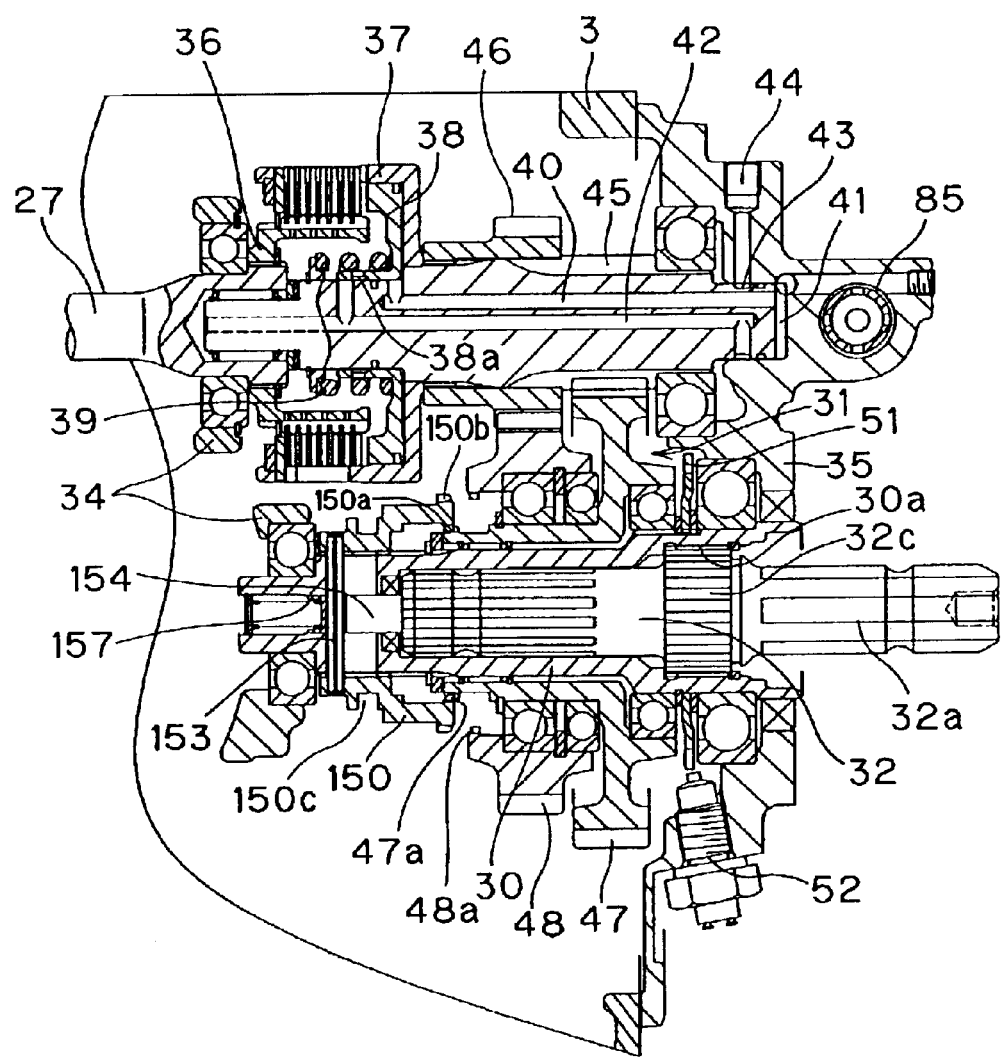
FIG. 14 is a sectional side view of a rear half area of a rear housing of the tractor according to a second embodiment of the present invention.
Figure 15:
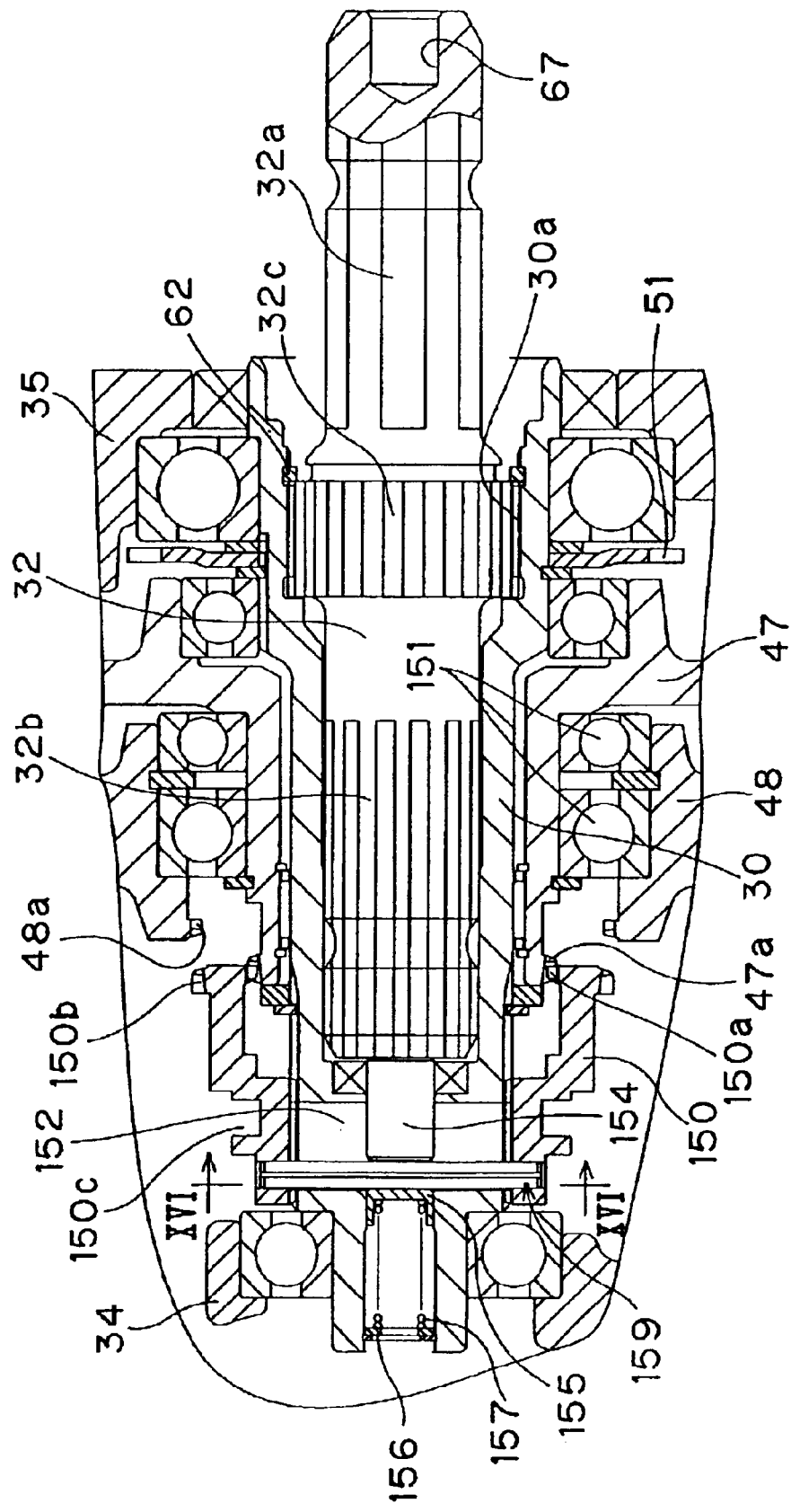
FIG. 15 is an enlarged fragmentary sectional side view of the same.
Figure 16:
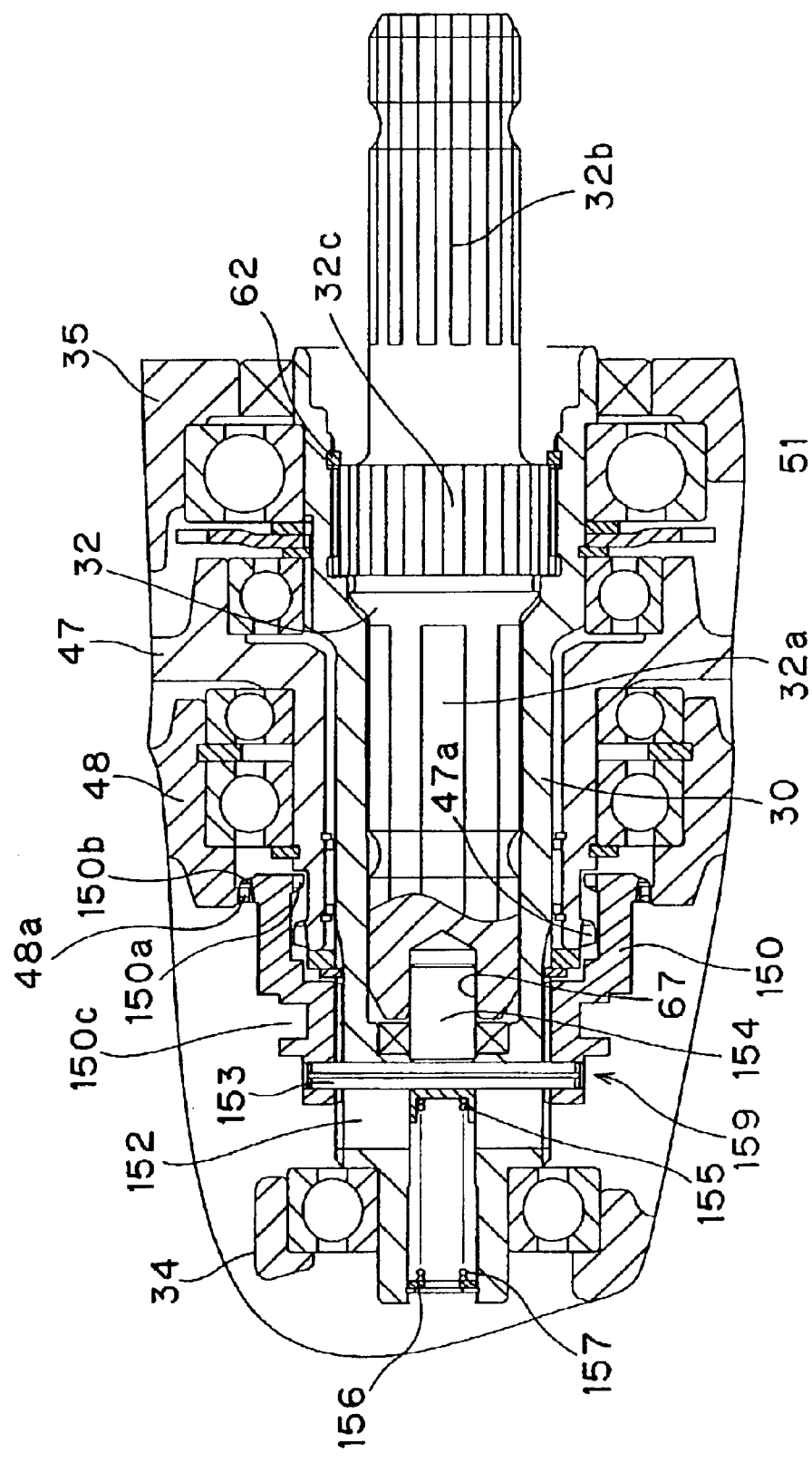
FIG. 16 is a sectional side view of the same at a different state.
Figure 17:
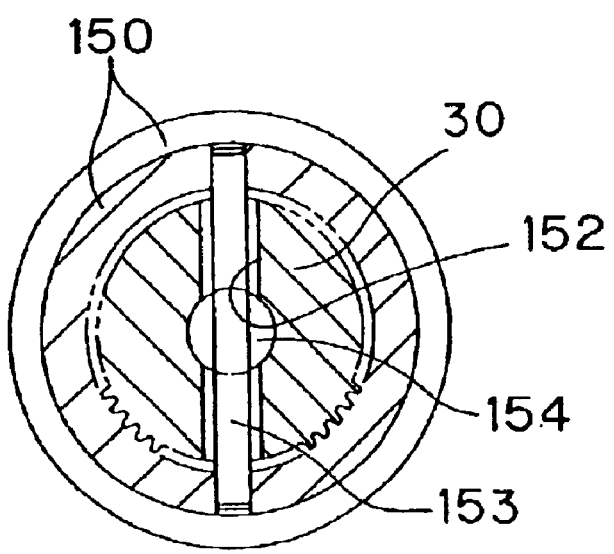
FIG. 17 is a cross sectional view taken along XVII—XVII line of FIG. 14.

A second embodiment of power take-off assembly shown in FIGS. 14 to 17 is almost similar to the above embodiment. As shown in FIGS. 14 to 16, the different point thereof from the above embodiment is that a collar 150 corresponding to shifter collar 50 is fitted around output sleeve 30 through splines and no member corresponding to collar 56 is provided.

Gears 47 and 48 are freely rotatably provided around output sleeve 30 so as to constitute PTO speed changing arrangement 31. A boss of gear 47 is greatly extended along output sleeve 30 toward collar 150. An outer periphery of utmost end of the extended boss of gear 47 serves as a toothed portion 47a which is enabled to mesh with a toothed portion 150a formed on an inner peripheral surface of collar 150. Gear 48 is freely rotatably disposed around the boss of gear 47 through a couple of ball bearings 151. A boss of gear 48 projects from bearing 151 toward collar 150 so as to be formed at an inner periphery of utmost end thereof with a toothed portion 48a, which is enabled to mesh with a toothed portion 150b formed on an outer peripheral surface of collar 150. Namely, toothed portions 150a and 150b, one of which is selected to engage either gear 47 or 48 with output sleeve 30, is formed at the inner and outer peripheral surfaces of collar 150, respectively, thereby reducing the sliding range of collar 150.

As shown in FIGS. 14 to 17, a diametric slot 152 is bored through output sleeve 30 and expanded to some degree in the axial direction of output sleeve 30. An elastic pin 153 is passed through slot 152 and fixedly engaged at both ends thereof into respective holes of collar 150. A pin 154 disposed axially of output sleeve 30 is supported by output sleeve 30 so as to project into slot 152 and abut against elastic pin 153. Oppositely to pin 154 with respect to elastic pin 153, a spring receiver 155 is disposed toward elastic pin 153, a spring receiver 156 is fixedly disposed at the inner end of output sleeve 30, and a compressed spring 157 is interposed between spring receivers 155 and 156. In this way, spring 157 biases elastic pin 153 and pin 154 together rightward (in FIGS. 14 to 16) so that pin 154 and spring receiver 155 constantly abut against elastic pin 153. Similarly to the above embodiment, splined end 32a of PTO shaft 32 having the small number of teeth is bored by hole 67, which corresponds to pin 154 in this embodiment.

Slot 152 is so designed in the length thereof along output sleeve 30 that, when spilned end 32b of PTO shaft 32 having the many teeth is inserted into output sleeve 30 as shown in FIG. 15, elastic pin 153 abuts against a left edge of slot 152 (in FIGS. 14 to 16), and that, when splined end 32a of PTO shaft 32 having the small number of teeth is inserted into output sleeve 30 as shown in FIG. 16, elastic pin 153 abuts against a right edge of slot 152 (in FIGS. 14 to 1 6). In the state of FIG. 15, pin 154 is inserted into hole 67 of PTO shaft 32, and toothed portion 150a of collar 150 comes to mesh with toothed portion 47a of gear 47 so as to engage gear 47 with output sleeve 30, thereby put PTO speed changing arrangement 31 into the first speed mode. In the state of FIG.

16, toothed portion 150b of collar 150 comes to mesh with toothed portion 48a of gear 48 so as to engage gear 48 with output sleeve 30, thereby put PTO speed changing arrangement 31 into the second speed mode. In this way, an actuator 159 is constituted so as to obtain the adequate sliding of collar 150.

Consequently, according to the second embodiment shown in FIGS. 14 to 17, only depending upon reversing PTO shaft 32 and inserting it into output sleeve 30, PTO shaft 32 is prepared for a low speed rotation (540 rpm) if splined end 32a having the fewer teeth projects outward from the tractor, or PTO shaft 32 shaft is prepared for a high speed rotation (1000 rpm) if splined end 32b having the more teeth projects outward from the tractor.

Incidentally, collar 150 is formed with a fork fitting groove 150c so that, if there is no elastic pin 153 or the like, a fork may be fitted into groove 150c so as to slide collar 150.

Although the present invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A power take-off assembly of a working vehicle, comprising:
    an output sleeve disposed longitudinally of the vehicle in an end portion of the vehicle;
    a low speed gear freely rotatably provided around said output sleeve; a high speed gear freely rotatably provided around said output sleeve, said high speed gear being greater in rotary speed than said low speed gear;
    a shifter collar disposed around said output sleeve between said high and low speed gears so as to selectively engage one of said high and low speed gears with said output sleeve;
    a PTO shaft having two opposite splined ends, the numbers of teeth of said splined ends being different from each other, wherein said PTO shaft is selectively reversibly inserted at one of said splined ends thereof into said output sleeve, connected to said output sleeve, and extended at the other splined end thereof outward from said end portion of the vehicle;
    a second collar disposed around inner end portion of said output sleeve, said second collar connected to said shifter collar so as to slide integrally with said shifter collar on said output sleeve; and
    an actuator for restraining the sliding of said second collar on said output sleeve, wherein said actuator is actuated by an end surface of said PTO shaft so as to hold said second collar at a position where said low speed gear engages with said output sleeve when one said splined end that is greater in number of teeth than the other splined end is inserted into said output sleeve.

2. A power take-off assembly according to claim 1, wherein said actuator comprises:
    a sensor slidably disposed in said inner end of said output sleeve;
    a cam surface formed on said sensor so as to be slant in an axial direction of said output sleeve;
    a pin disposed radially of said output sleeve;
    a hole formed in said output sleeve; and
    a recess formed in an inner peripheral surface of said second collar, wherein said pin is passed through said hole while said pin is abutting against said cam surface so as to selectively project from said output sleeve into said recess.

3. A power take-off assembly according to claim 1, further comprising:
    a slidably supported fork shaft;
    a shift fork fixed to said fork shaft so to slide said shifter collar; and
    a second fork engaging with said second collar, said second fork being relatively rotatably provided on said fork shaft.

4. A power take-off assembly of a working vehicle, comprising:
    an output sleeve disposed longitudinally of the vehicle in an end portion of the vehicle;
    a low speed gear freely rotatably provided around said output sleeve; a high speed gear freely rotatably provided around said output sleeve, said high speed gear being greater in rotary speed than said low speed gear;
    a shifter collar disposed around said output sleeve between said high and low speed gears so as to selectively engage one of said high and low speed gears with said output sleeve;
    a PTO shaft having two opposite splined ends, the numbers of teeth of said splined ends being different from each other, wherein said PTO shaft is selectively reversibly inserted at one of said splined ends thereof into said output sleeve, connected to said output sleeve, and extended at the other splined end thereof outward from said end portion of the vehicle;
    a second collar disposed around an inner end portion of said output sleeve, said second collar connected to said shifter collar so as to slide integrally with said shifter collar on said output sleeve; and
    an actuator for restraining the sliding of said second collar, wherein said actuator prevents one said splined end that is greater in number of teeth than the other splined end from being inserted into said output sleeve over a predetermined depth when said high speed gear engages with said output sleeve.

5. A power take-off assembly according to claim 4, wherein said actuator comprises:
    a sensor slidably disposed in said inner end of said output sleeve;
    a cam surface formed on said sensor so as to be slant in an axial direction of said output sleeve;
    a pin disposed radially of said output sleeve;
    a hole formed in said output sleeve; and
    a recess formed in an inner peripheral surface of said second collar, wherein said pin is passed through said hole while said pin is abutting against said cam surface so as to selectively project from said output sleeve into said recess.

6. A power take-off assembly according to claim 4, further comprising:
    a slidably supported fork shaft;
    a shift fork fixed to said fork shaft so as to slide said shifter collar; and
    a second fork engaging with said second collar, said second fork being relatively rotatably provided on said fork shaft.

7. A power take-off assembly of a working vehicle, comprising:
    an output sleeve disposed longitudinally of the vehicle in an end portion of the vehicle;

a low speed gear freely rotatably provided around said output sleeve;

a high speed gear freely rotatably provided around said output sleeve, said high speed gear being greater in rotary speed than said low speed gear, and one of said high and low speed gears being disposed further outward than the other so as to serve as an outer gear, and the other serving as an inner gear;

a PTO shaft having two opposite splined ends, the numbers of teeth of said splined ends being different from each other, wherein said PTO shaft is selectively reversibly inserted at one of said splined ends thereof into said output sleeve, connected to said output sleeve, and extended at the other splined end thereof outward from said end portion of the vehicle;

a collar slidably disposed around an inner end portion of said output sleeve so as to selectively engage one of said high and low speed gears with said output sleeve;

an actuator for sliding said collar on said output sleeve, wherein said actuator slides said collar to one position where said low speed gear engages with said output sleeve when one said splined end having more teeth in number is inserted into said output sleeve, and wherein said actuator slides said collar to another position where said high speed gear engages with said output sleeve when the other splined end having less teeth in number is inserted into said output sleeve;

a first pin disposed in said output sleeve so as to constitute said actuator, wherein the position of said first pin in an axial direction of said output sleeve is changed correspondingly to the insertion state of said PTO shaft into said output sleeve;

a boss portion of said outer gear extended along said output sleeve toward said collar;

a first toothed portion formed on the outer peripheral surface of said extended boss portion;

a second toothed portion formed on the inner peripheral surface of said collar so as to be enabled to mesh with said first toothed portion of said outer gear;

a bearing interposed between said inner gear and said boss portion of said outer gear so as to freely rotatably dispose said inner gear around said boss portion of said outer gear, wherein said inner gear has a projecting portion which projects from said bearing along said output sleeve toward said collar;

a third toothed portion formed on the inner peripheral surface of said projecting portion of said inner gear; and a fourth toothed portion formed on the outer peripheral surface of said collar so as to be enabled to mesh with said third toothed portion of said inner gear.

* * * * *